United States Patent
Brown, II et al.

(10) Patent No.: US 12,325,556 B2
(45) Date of Patent: Jun. 10, 2025

(54) REPOSITIONABLE DIVIDER AND CONTAINER REINFORCING COUPLER

(71) Applicant: Gregory Cavett Brown, II, Leander, TX (US)

(72) Inventors: Gregory Cavett Brown, II, Leander, TX (US); Timothy Bottger, Brooklyn Park, MN (US)

(73) Assignee: Gregory Cavett Brown, II, Leander, TX (US)

( * ) Notice: Subject to any disclaimer, the term of this patent is extended or adjusted under 35 U.S.C. 154(b) by 322 days.

(21) Appl. No.: 18/056,175

(22) Filed: Nov. 16, 2022

(65) Prior Publication Data

US 2023/0174274 A1 Jun. 8, 2023

Related U.S. Application Data

(60) Provisional application No. 63/264,128, filed on Nov. 16, 2021.

(51) Int. Cl.
*B65D 25/06* (2006.01)

(52) U.S. Cl.
CPC .................... *B65D 25/06* (2013.01)

(58) Field of Classification Search
CPC .......... B65D 25/04; B65D 25/06; B60R 9/00; B60R 7/02
See application file for complete search history.

(56) References Cited

U.S. PATENT DOCUMENTS 5,215,205 A * 6/1993 Behlman ................... B60R 7/02
224/539
5,584,412 A * 12/1996 Wang ........................ B60R 7/02
220/500

(Continued)

FOREIGN PATENT DOCUMENTS

CN 206813573 U 12/2017
CN 107814064 A 3/2018

(Continued)

OTHER PUBLICATIONS

Bricklink, Bar Holder with Clip Angled, 2021-2022, retrieved Aug. 8, 2022, https://www.bricklink.com/v2/catalog/catalogitem.page?P=72869#T=C.

(Continued)

*Primary Examiner* — Don M Anderson
(74) *Attorney, Agent, or Firm* — Thompson Patent Law

(57) ABSTRACT

Apparatus and associated methods relate to a detachable reinforcing system (DRS). In an illustrative example, the DRS may include a detachable coupler, interior dividers, and a cargo receiving module. The DRS may, for example, support the interior divider within the cargo receiving module. Multiple detachable couplers may, for example, be configured to have prepositioned rib channels. The rib channels may, for example, enable the detachable couple to couple the interior divider of the cargo receiving module to an exterior wall of the cargo receiving module. The interior dividers may, for example, be configured to couple with other interior dividers within the cargo receiving module. For instance, two interior dividers may be coupled to the exterior wall of the cargo receiving module to form a smaller interior storage area. Various embodiments may advantageously enable a robust modular cargo system to resist (Continued)

accidental decoupling of dividers from the exterior wall during travel.

20 Claims, 55 Drawing Sheets

(56) References Cited

U.S. PATENT DOCUMENTS

| | | | | |
|---|---|---|---|---|
| 7,984,820 | B2* | 7/2011 | Dancyger | A45C 13/02 |
| | | | | 220/532 |
| 9,227,316 | B2 | 1/2016 | Stevens | |
| 9,259,836 | B2 | 2/2016 | Raphel | |
| 9,637,294 | B2* | 5/2017 | Kinskey | B65D 11/18 |
| 10,151,520 | B2 | 12/2018 | Christensen | |
| 10,442,568 | B1 | 10/2019 | Summers | |
| 10,562,694 | B2 | 2/2020 | Austerberry et al. | |
| 10,597,191 | B2 | 3/2020 | Seiders et al. | |
| 10,676,241 | B1 | 6/2020 | Kaldahl | |
| 10,752,403 | B1* | 8/2020 | Rinear | B60R 11/00 |
| 10,858,151 | B2 | 12/2020 | Schaefer et al. | |
| 10,906,723 | B2 | 2/2021 | Guerdrum et al. | |
| 11,242,175 | B2* | 2/2022 | Barfoot | B65D 81/3818 |
| 11,490,768 | B1* | 11/2022 | Ippolito | B60N 3/103 |
| 11,827,135 | B1* | 11/2023 | Crow, Jr. | B62D 25/20 |
| 2005/0189387 | A1* | 9/2005 | Fatigati | B60R 7/02 |
| | | | | 224/497 |
| 2012/0080432 | A1 | 4/2012 | Bensman et al. | |
| 2016/0325885 | A1* | 11/2016 | Plattner | B65D 25/06 |
| 2018/0015883 | A1* | 1/2018 | Loew | B60R 7/02 |
| 2018/0016060 | A1* | 1/2018 | Peach | B65D 21/0234 |
| 2018/0201404 | A1 | 7/2018 | Lam et al. | |
| 2018/0354687 | A1 | 12/2018 | Seiders et al. | |
| 2019/0009731 | A1* | 1/2019 | Salazar Loera | B60R 11/00 |
| 2019/0184904 | A1* | 6/2019 | Fang | B60R 7/04 |
| 2020/0055631 | A1* | 2/2020 | Combs | B65D 21/0215 |
| 2020/0216224 | A1 | 7/2020 | Nichols et al. | |
| 2021/0031979 | A1* | 2/2021 | Feurer | B65D 1/22 |
| 2021/0039831 | A1* | 2/2021 | Brunner | B65D 21/0212 |
| 2021/0284426 | A1* | 9/2021 | Kalajyan | B65D 81/3813 |
| 2021/0339910 | A1* | 11/2021 | Schuldt | A47F 5/005 |
| 2022/0119187 | A1* | 4/2022 | Thomas | B65D 43/16 |
| 2022/0212839 | A1* | 7/2022 | Zhang | B65D 25/04 |
| 2022/0241956 | A1 | 8/2022 | Samsel et al. | |
| 2023/0174274 | A1* | 6/2023 | Brown, II | B60R 9/00 |
| | | | | 220/542 |
| 2024/0009936 | A1* | 1/2024 | Poran | B29C 65/08 |

FOREIGN PATENT DOCUMENTS

| | | |
|---|---|---|
| EP | 2551210 A1 | 1/2013 |
| EP | 3587294 B1 | 12/2020 |
| JP | 2020040666 A | 3/2020 |

OTHER PUBLICATIONS

Red Hound Auto, 4 Piece Kit Rubber T Handle Latch Catch Hold-Down, Amazon.com, retrieved Aug. 8, 2022, https://www.amazon.com/Hold-Down-Stainless-Brackets-Replacement-Compartment/dp/B00Y3H4W6O?th=1.

UES International, Flexible T-Handle Latch, retrieved Aug. 8, 2022, https://www.uesint.com/product/flexible-t-handle-latch/.

* cited by examiner

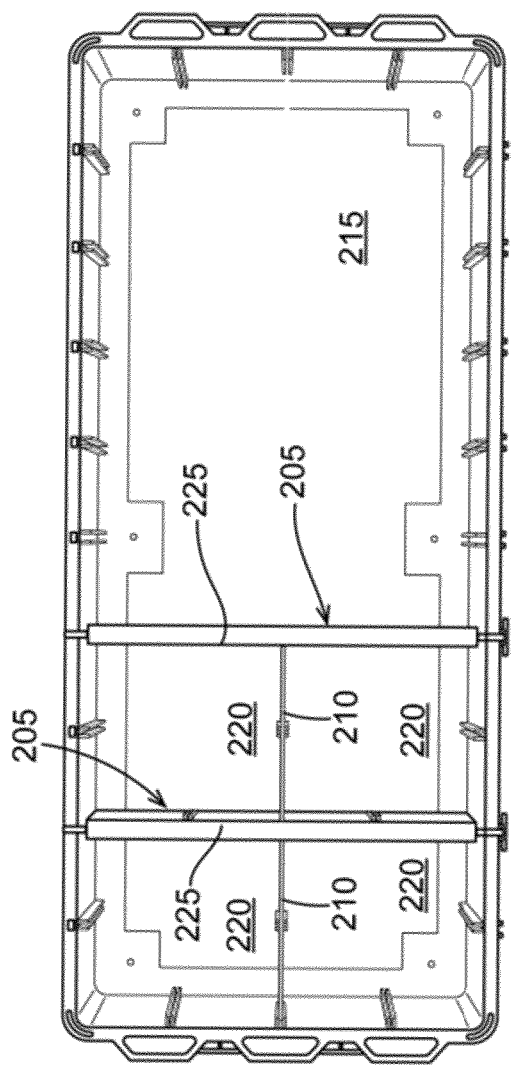
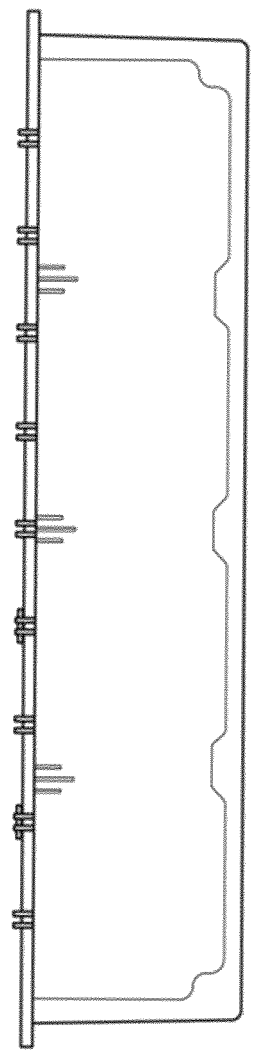
FIG. 2A
FIG. 2B

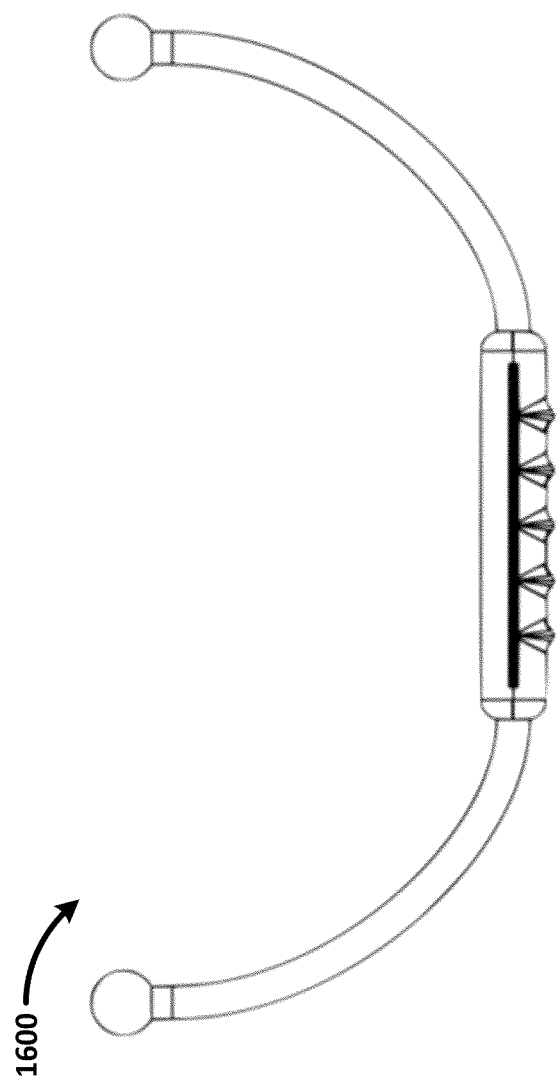

REPOSITIONABLE DIVIDER AND CONTAINER REINFORCING COUPLER

CROSS-REFERENCE TO RELATED APPLICATIONS

This application also claims the benefit of U.S. Provisional Application Ser. No. 63/264,128, titled "repositionable divided and container reinforcing coupler," filed by Greg Brown, et al., filed on Nov. 16, 2021.

This application incorporates the entire contents of the foregoing application(s) herein by reference.

TECHNICAL FIELD

Various embodiments relate generally to repositionable storage containers.

BACKGROUND

Containers may, for example, serve as receptacles and/or enclosures for holding a product during storage packaging, and transportation. A container may be opened or closed. Products may, for example, be inserted into or retrieved from containers. Containers may be secured during transport to the vehicle in which the containers are being transported in. Conventionally, containers may be transported on motor vehicles, such as on boats, cars, planes, and/or trucks.

Some products may, for example, need protection during transportation. Products within containers may be protected on several sides by being inside a container. The products may also include internal packaging to prevent damage to goods during travel. The products contained may be of various sizes.

SUMMARY

Apparatus and associated methods relate to a detachable reinforcing system (DRS). In an illustrative example, the DRS may include a detachable coupler, interior dividers, and a cargo receiving module. The DRS may, for example, support the interior divider within the cargo receiving module. Multiple detachable couplers may, for example, be configured to have prepositioned rib channels. The rib channels may, for example, enable the detachable couple to couple the interior divider of the cargo receiving module to an exterior wall of the cargo receiving module. The interior dividers may, for example, be configured to couple with other interior dividers within the cargo receiving module. For instance, two interior dividers may be coupled to the exterior wall of the cargo receiving module to form a smaller interior storage area. Various embodiments may advantageously enable a robust modular cargo system to resist accidental decoupling of dividers from the exterior wall during travel.

Various embodiments may achieve one or more advantages. For example, in some embodiments the detachable coupler may snap into the containing receiver module with a removable head, a removable rim, and/or a removable straddler. A combination of the removable head and the removable straddler may, for example, advantageously support the coupling of the interior dividers to the exterior wall facing an interior. The exterior walls facing an exterior may, for example, be coupled with the removable rim. The ribs, for example, may advantageously align and/or retain interior dividers inserted into the interior receiving module.

In some embodiments, the cargo receiving module may include drain holes, rubber handles, rubber feet, strap ports and/or cable ports. The drain holes may, for example, advantageously drain fluid that may accidently accumulate within the cargo receiving module. The rubber handles may, for example, advantageously support a grip as the cargo receiving module is being transported. The rubber feet may, for example, advantageously prevent movement within the transport vehicle. The straps may, for example, reinforce the coupling of the detachable couplers and/or couple the cargo receiving module to a transport vehicle.

In some embodiments, the cargo receiving module may include a latch receiver where the latch receiver receives the detachable coupler. A height of a first side of the latch may be greater than a second side of the latch. This height difference may, for example, allow the first side of the latch to act as a receiving port. Accordingly, for example, the second side of the latch may advantageously act as a reinforcing member for coupling the detachable member to the cargo receiving module.

BRIEF DESCRIPTION OF THE DRAWINGS

FIG. 2A and FIG. 2B depict a top view and a side view, respectively, of an exemplary repositionable storage container.

FIG. 16A, FIG. 16B, FIG. 16C, FIG. 16D, FIG. 16E, and FIG. 16F show a side view, a perspective view, another perspective view, a bottom view, a top view, and an end view, respectively, of an exemplary handle.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary repositionable storage container is introduced with reference to FIGS. 1-3B. Second, that introduction leads into a description with reference to FIG. 4 of an exemplary embodiment of an exemplary repositionable storage container including container reinforcing couplers and repositionable dividers. Third, with reference to FIGS. 5-7, this document describes exemplary apparatus and methods useful for coupling of the repositionable divider to the outer shell of an exemplary repositionable storage container using an exemplary container reinforcing coupler. Fourth, with reference to FIGS. 8A-10, various features are described in application to an outer shell of an exemplary repositionable storage container. Fifth, and with reference to FIGS. 11A-11G, the discussion turns to exemplary embodiments that illustrate an exemplary repositionable divider. Sixth, this disclosure turns to discuss in further details of an exemplary container reinforcing coupler with reference to FIGS. 12A-12G. Finally, with reference to FIGS. 13-18E, the document discusses further embodiments, exemplary applications and aspects relating to repositionable storage containers.

Figure 1:
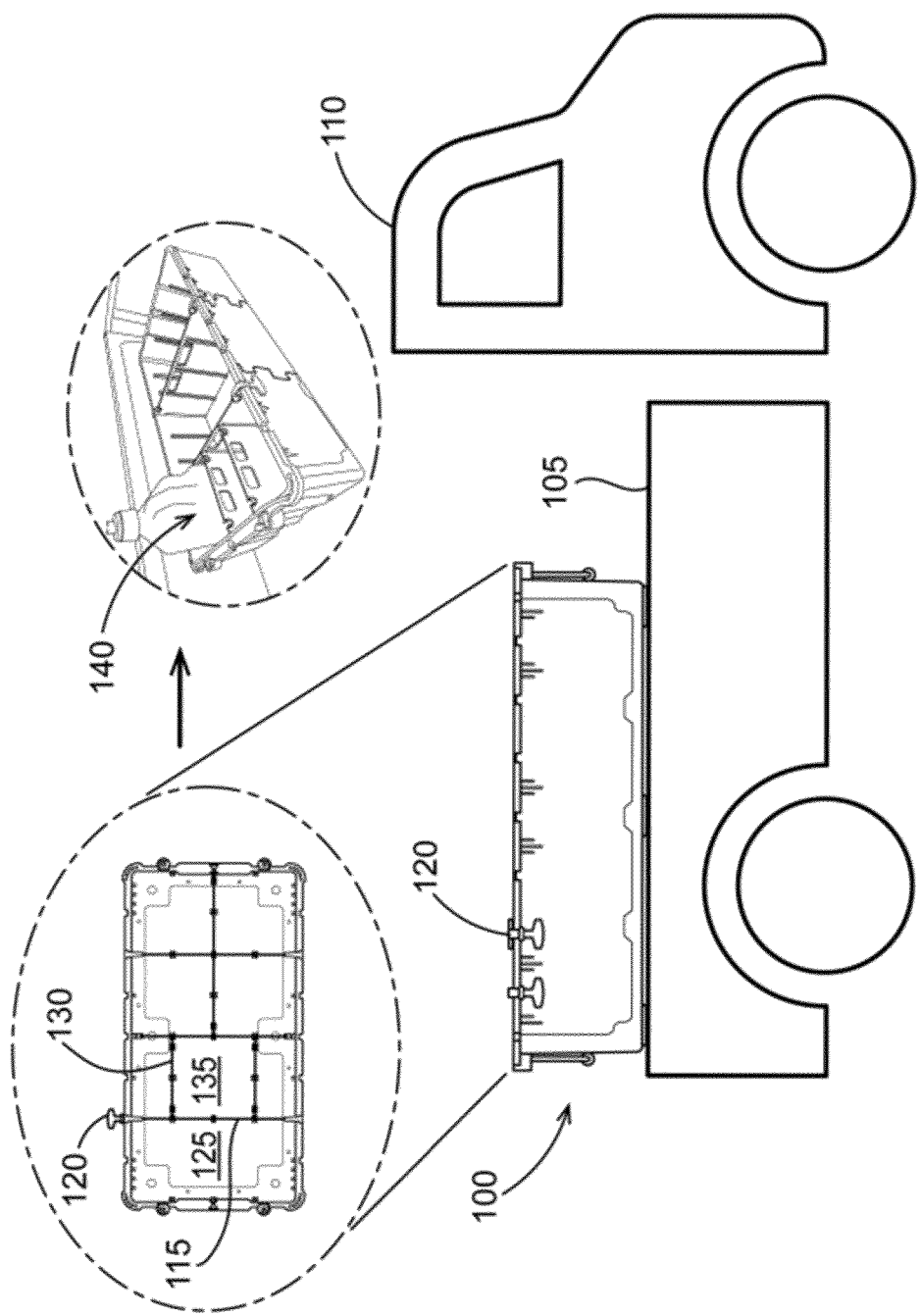
FIG. 1 depicts an exemplary repositionable storage container employed in an illustrative use-case scenario.

FIG. 1 depicts an exemplary repositionable storage container (an RSC 100) employed in an illustrative use-case scenario. In this example, the RSC 100 is resting on a truck bed 105 of a truck 110. For example, the RSC 100 may be a plastic container configured to have at least one compartment cavity for carrying cargo on the truck. For example, the cargo may include gas canisters, camping equipment, sport equipment, and/or any other objects fitting into the compartment cavity.

In some implementations, the RSC 100 may be reconfigurable with different length of repositionable dividers. As shown in a top view blown up diagram in FIG. 1, the RSC 100 includes at least one repositionable divider 115 and at least one pair of container reinforcing couplers 120. In some implementations, the repositionable divider 115 may be releasably inserted into the RSC 100. For example, the repositionable dividers 115 may be inserted into the RSC 100 to create compartments 135 in the RSC 100. In this example, two short repositionable dividers 130 may be releasably inserted between two long repositionable dividers 115 to create a smaller compartment 135.

In some implementations, after the repositionable divider 115 is inserted between the sidewall of the RSC 100, a pair of the container reinforcing couplers 120 may be coupled to opposite ends of the repositionable divider 115 to fixedly couple the repositionable divider 115 to the RSC 100. The container reinforcing coupler 120 may strengthen an outer shell of the RSC 100, for example.

As an illustrative example without limitation, the RSC 100 may contain various cargo 140. For example, a user may use the repositionable dividers 115 and 125 to configure a compartment of various sizes such that the cargo 140 may be kept upright. In some examples, the repositionable dividers 115 and 125 may prevent gas canisters from substantially sliding and/or falling by creating the compartment 135 to be substantially tightly fitted to the size of the gas canisters. In some other examples, a user may use the repositionable dividers 115 and 125 to configure the RSC 100 to fit a plurality of gears including, gas canister, coolers, buckets, etc. In various implementations, by using difference sizes of repositionable dividers, the RSC 100 may advantageously provide subdividing capability for various size of cargo.

FIG. 1 depicts exemplary embodiments of an RSC in illustrative use-case scenarios. In an illustrative example, the depicted embodiment includes coupling joints. For example, the body of the RSC may include multiple sections coupled together. The sections may be fixedly coupled together at the coupling joint(s). In some embodiments, for example, the sections may be permanently coupled together (e.g., permanent adhesive, welded). In some embodiments the sections may be releasably coupled together.

FIGS. 2A-2B depict an exemplary repositionable storage container. As an illustrative example, the RSC 100 may be 56.5" long, 23.5" wide, and 12" deep. In some implementations, depending on the usage of the RSC 100, other dimensions of the RSC 100 may be possible. For example, the RSC 100 may be 50" long, 24" wide, and 12" deep. For example, the RSC 100 may have a reduced depth to facilitate easy retrieval of smaller gears or cargo, such as golf bags or other sports gear.

In this example, the RSC 100 includes two long repositionable dividers 205 coupled to the side wall of the RSC 100. A short repositionable divider 210 is inserted between a front wall of the RSC 100 and one of the long repositionable dividers. Another short repositionable divider is coupled between two long repositionable dividers. As shown, one large compartment 215 and four small compartments 220 are created, in this example.

As shown in FIG. 2, the RSC 100 includes rubber straps 225. The rubber straps may, for example, be strapped on opposite walls of the RSC 100 on top of the long repositionable dividers 115. In some implementations, the rubber straps 225 may be strapped across top of dividers to hold the dividers against the bottom of the RSC 100. For example, the rubber straps 225 may hold the repositionable dividers 115, during transportation, to prevent buckling of the long repositionable dividers 205.

Figure 3A:
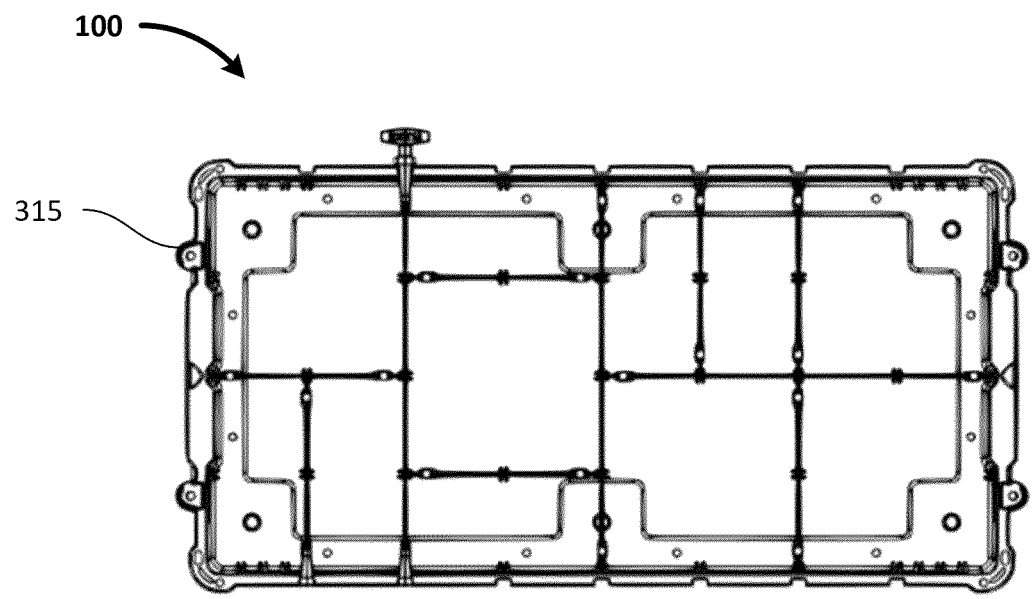
FIG. 3A shows a top view and FIG. 3B shows a bottom view of an exemplary repositionable storage container.
Figure 3B:
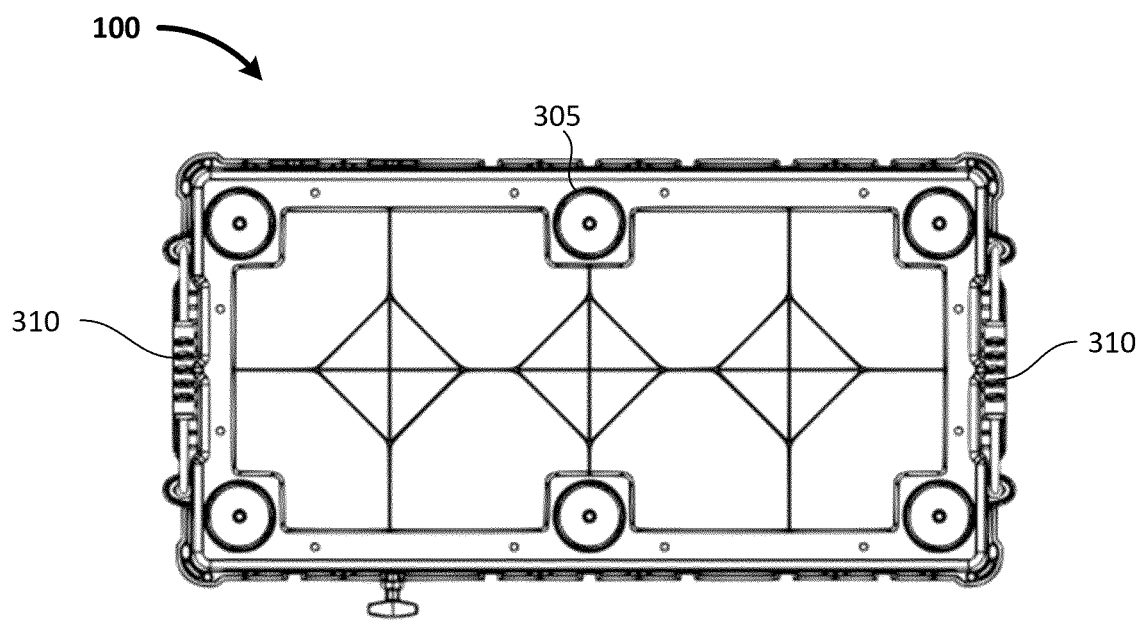

FIG. 3A and FIG. 3B show a top view and a bottom view of an exemplary repositionable storage container. In this example, the RSC 100 includes a plurality of feet 305. In some implementations, the feet 305 may be rubber feet. For example, the rubber feet may be used to substantially prevent sliding of the RSC 100 on the truck bed 110 during transportation. In some implementations, the feet 305 may be magnetic feet. For example, the RSC 100 may include magnetic feet to substantially be fixated on the truck bed 110 by magnetic force. In some examples, during transportation, the magnetic feet may prevent vertical and horizontal movement of the RSC 100.

As shown in FIG. 3B, the RSC 100 includes a handle 310 on opposite ends. The handle 310, in this example, is attached under a notch 315. In some implementations, the notch 315 may allow a top of the RSC 100 to remain flat. For example, the flat top of the RSC 100 may allow one or more RSC 100 to be stacked on another RSC 100.

Figure 4:
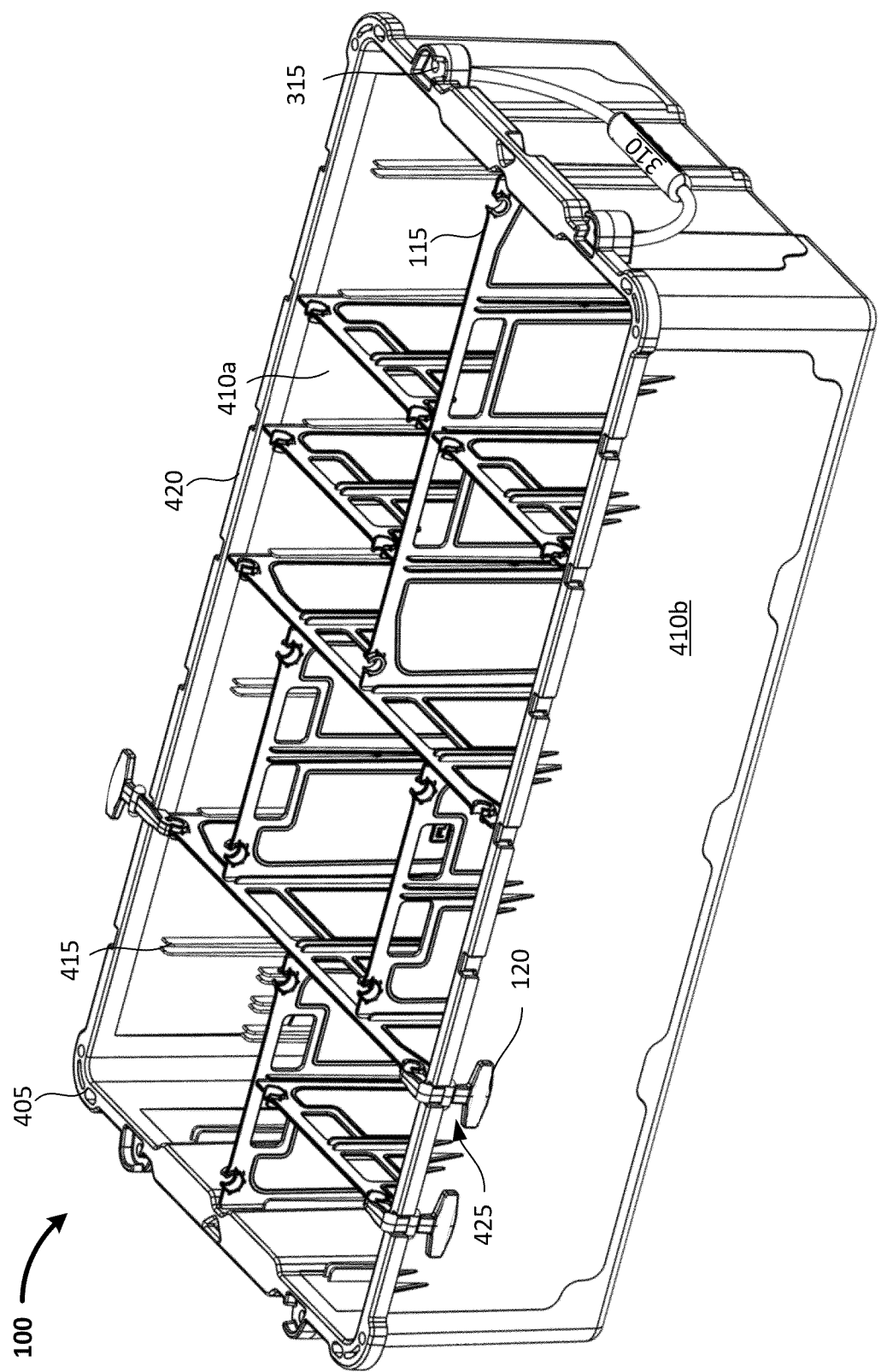
FIG. 4 shows an exemplary repositionable storage container including container reinforcing couplers and multiple repositionable dividers.

FIG. 4 shows an exemplary repositionable storage container including repositionable dividers 115 and container reinforcing couplers 120. In some implementations, as shown in FIG. 4, the repositionable dividers 115 may be placed in perpendicular to each other. For example, the repositionable dividers 115 placed perpendicularly may enable a X-Y direction subdivision within the RSC 100.

As shown in this example, the RSC 100 includes the handle 310 under the notch 315 to substantially maintain a flat top for the RSC 100. The RSC 100 further includes tie down points 405. In some implementations, a user may route security cables through the tiedown points 405 to prevent theft. In some implementations, a user may engage tiedown straps through the tiedown points 405 to prevent movement during transportation of the RSC 100.

In the depicted example, the RSC 100 includes two side walls 410a and 410b. On an inner face of each of the side walls 410a and 410b, the RSC 100 includes a number of divider insertion channels 415. For example, the repositionable dividers 115 may be inserted into a pair of the divider insertion channels 415 on opposite side walls 410a and 410b to define a compartment within the RSC 100.

Each of the side walls 410a and 410b includes, in this example, a lip 420 substantially at an upper edge of the side walls 410a, 410b. Each of the lips 420 may, in some implementations, include at least one coupling module 425. For example, the coupling module 425 may include engagement features formed in an underside of the lip to engage couplers for fixedly couple the repositionable divider 115 to the RSC 100. In various implementations, the coupling module 425 may, for example, be cavities formed into the lip. In some embodiments, the coupling module 425 may, for example, be disposed on an outer surface of the side walls relative to the cavity. In some examples, the coupling module 425 may engage the long repositionable divider 205 (e.g., a rubber strap). In some examples, the coupling module 425 may engage the container reinforcing couplers 120.

For example, a user may define a compartment within the RSC 100 by inserting the repositionable divider 115 into the divider insertion channels 415 on opposite walls 410a and 410b. After the repositionable divider 115 is coupled to the RSC 100, the user may use a pair of the container reinforcing couplers 120 to releasably couple the repositionable divider 115 to one of the opposing side walls 410a and 410b securely.

Figure 5:
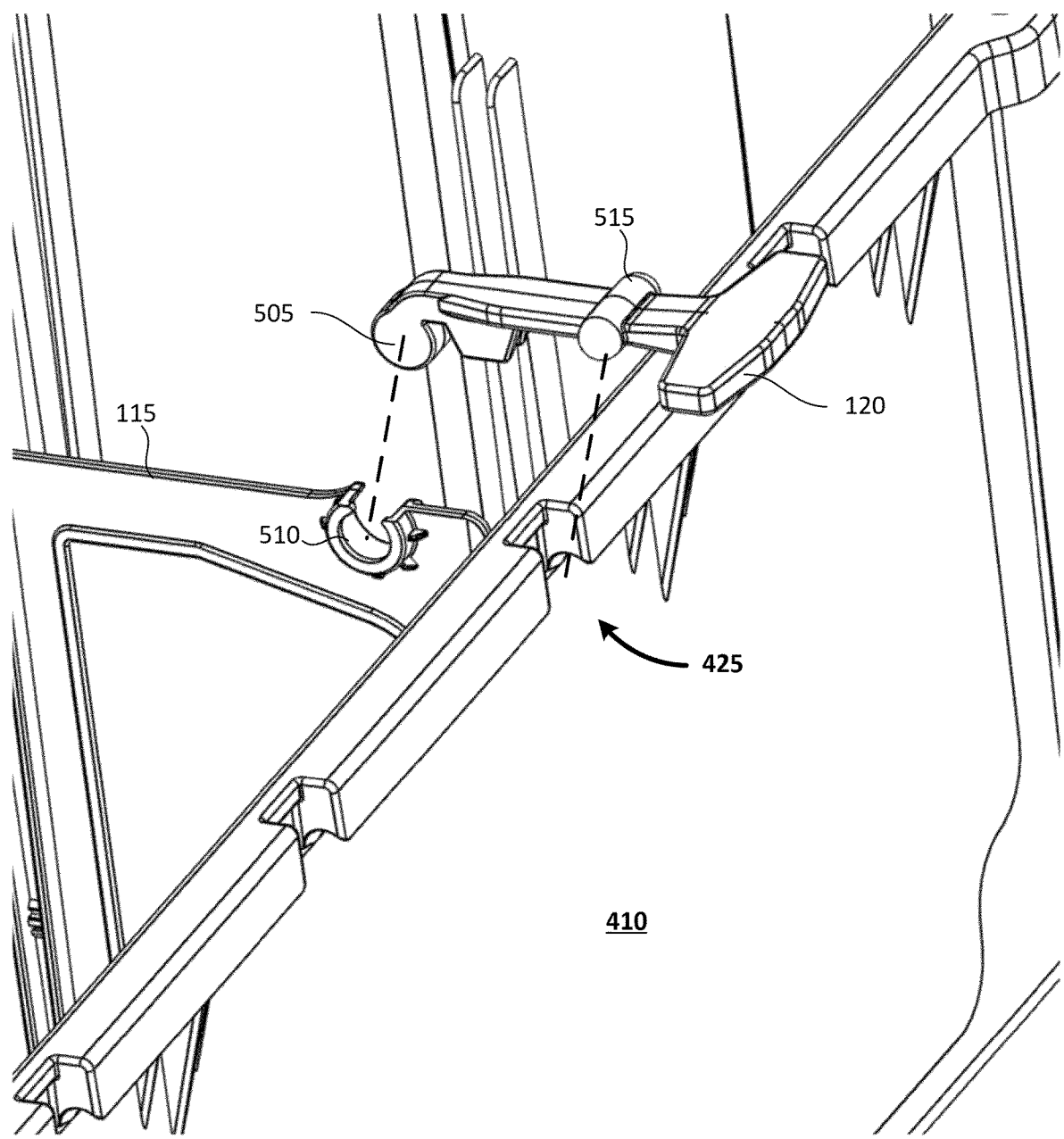
FIG. 5 shows an exemplary container reinforcing coupler before coupling to an exemplary repositionable storage container.

FIG. 5 shows an exemplary container reinforcing coupler 120 before coupling to an exemplary repositionable storage container. As shown in FIG. 5, the repositionable divider 115 is inserted into the side wall 410 of the RSC 100. For example, a user may use a pair of the container reinforcing coupler 120 to reinforce the side walls 410 of the RSC 100 to prevent buckling. In this example, the container reinforcing coupler 120 includes a first engagement member 505. As an illustrative example, the repositionable divider 115, as shown, includes a corresponding engagement feature 510 for releasably coupling with the container reinforcing coupler 120. The container reinforcing coupler 120 also includes a second engagement member 515 corresponding to the coupling modules 425.

In some implementations, the container reinforcing coupler 120 may be configured such that, upon bringing the first engagement member 505 into register with and releasably coupling to the corresponding engagement feature 510 and operating the container reinforcing coupler 120 into a latching position, the second engagement member 515 of the container reinforcing coupler 120 may be brought into register and releasably couple to the corresponding coupling module(s) 425 of the side wall 410.

Figure 6:
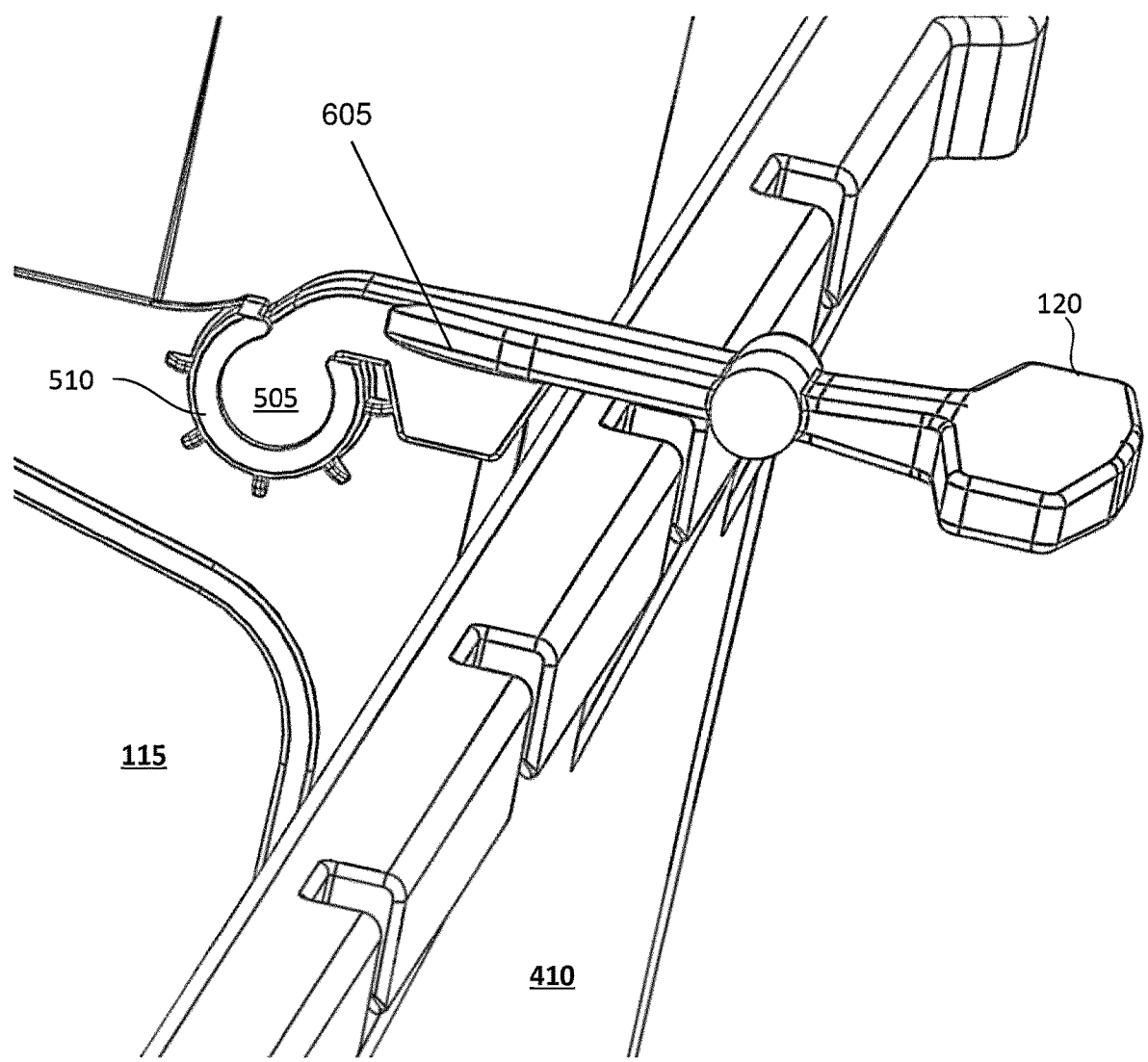
FIG. 6 shows an exemplary container reinforcing coupler coupled to an exemplary repositionable divider before latching into an outer shell of an exemplary repositionable storage container.

FIG. 6 shows an exemplary container reinforcing coupler 120 coupled to an exemplary repositionable divider 115 before coupling into a side wall 410 of an exemplary repositionable storage container. As an illustrative example, in some implementations, the first engagement member 505 is brought into register with and releasably coupled to the corresponding engagement feature 510.

As shown, the container reinforcing coupler 120 includes a straddler 605. In the depicted example, the straddler 605 includes a pair of parallel protrusions extending out of the longitudinal axis of the coupler 120. When the coupler is coupled to the divider and operated downward, the extrusions extend out of the longitudinal axis to an opposing side of the divider to resist lateral movement of the divider relative to the corresponding coupler.

Figure 7:
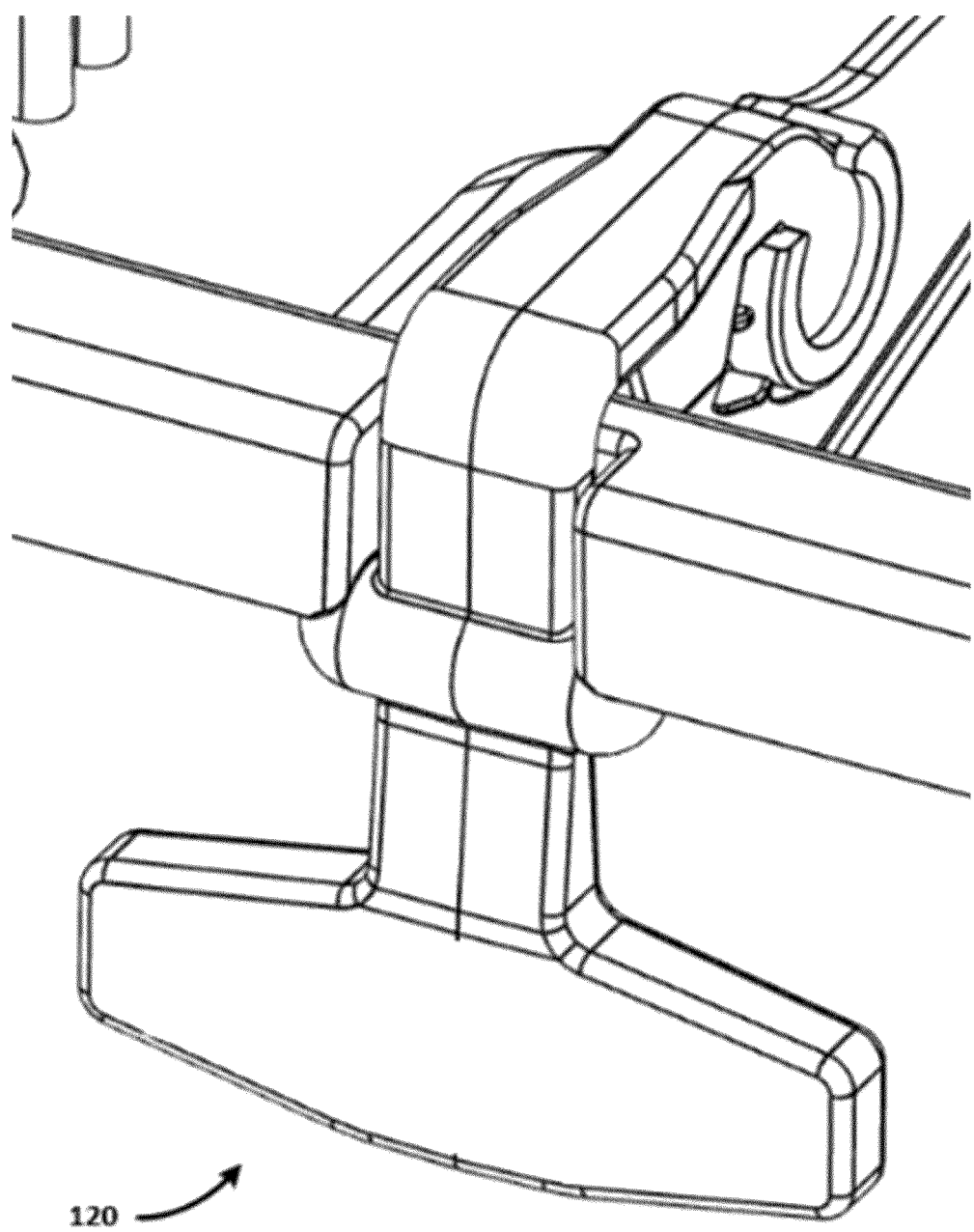
FIG. 7 shows an exemplary container reinforcing coupler after coupling to an exemplary repositionable storage container.

FIG. 7 shows an exemplary container reinforcing coupler 120 after coupling to an exemplary repositionable storage container (e.g., RSC 100). As shown, the second engagement member 515 of the container reinforcing coupler 120 is brought into register and releasably coupled to the corresponding coupling module 425 of the side wall 410.

In some implementations, the container reinforcing coupler 120 may, for example, be at least partially elastic. For example, when a pair of the container reinforcing coupler 120 are engaged at each end of the inserted repositionable divider 115, the pair of the container reinforcing couplers 120 may induce a tension force at the coupling module 425 at the side wall 410. For example, the pair of the container reinforcing couplers 120 may cooperate to apply a tension substantially along an axis defined by the repositionable divider 115 the two opposing side walls 410a and 410b. Accordingly, by engaging a pair of the container reinforcing coupler 120 at each side of the repositionable divider 115 to the coupling module 425, the container reinforcing coupler 120 may reinforce the RSC 100 to be more buckling resistant.

FIG. 8A, FIG. 8B, FIG. 8C, FIG. 8D, FIG. 8E, FIG. 8F, and FIG. 8G show a perspective view, a top view, a bottom view, a front view, a back view, a left-side view, and a right-side view, respectively, of an outer shell of an exemplary repositionable storage container. In some implementations, the outer shell of the RSC 100 may be made with reinforced plastic. In some implementations, the thickness of the outer shell may be substantially thicker than 0.2 inches.

Figure 8A:
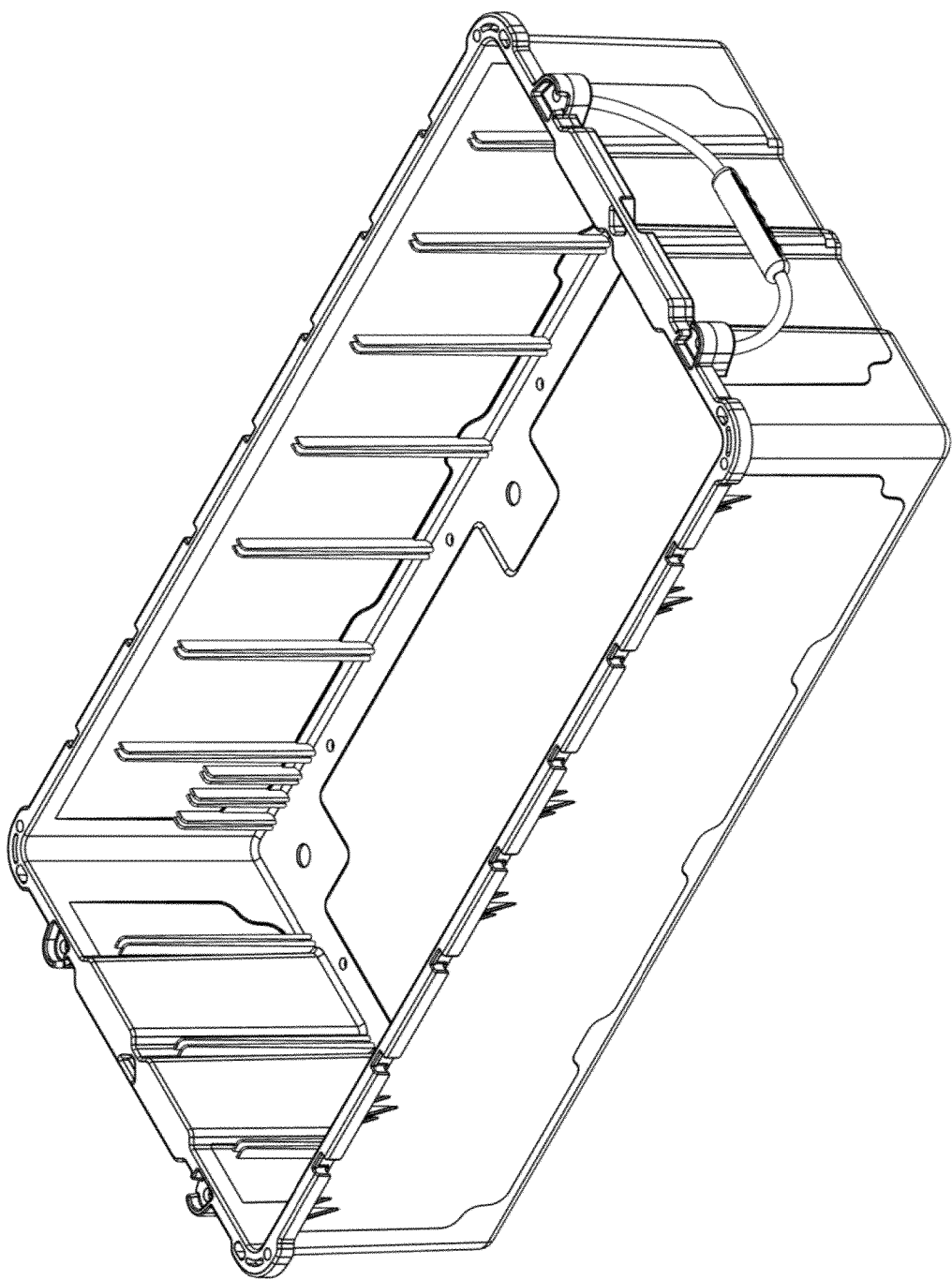
FIG. 8A, FIG. 8B, FIG. 8C, FIG. 8D, FIG. 8E, FIG. 8F, and FIG. 8G show a perspective view, a top view, a bottom view, a front view, a back view, a left-side view, and a right-side view, respectively, of an outer shell of an exemplary repositionable storage container.
Figure 8B:
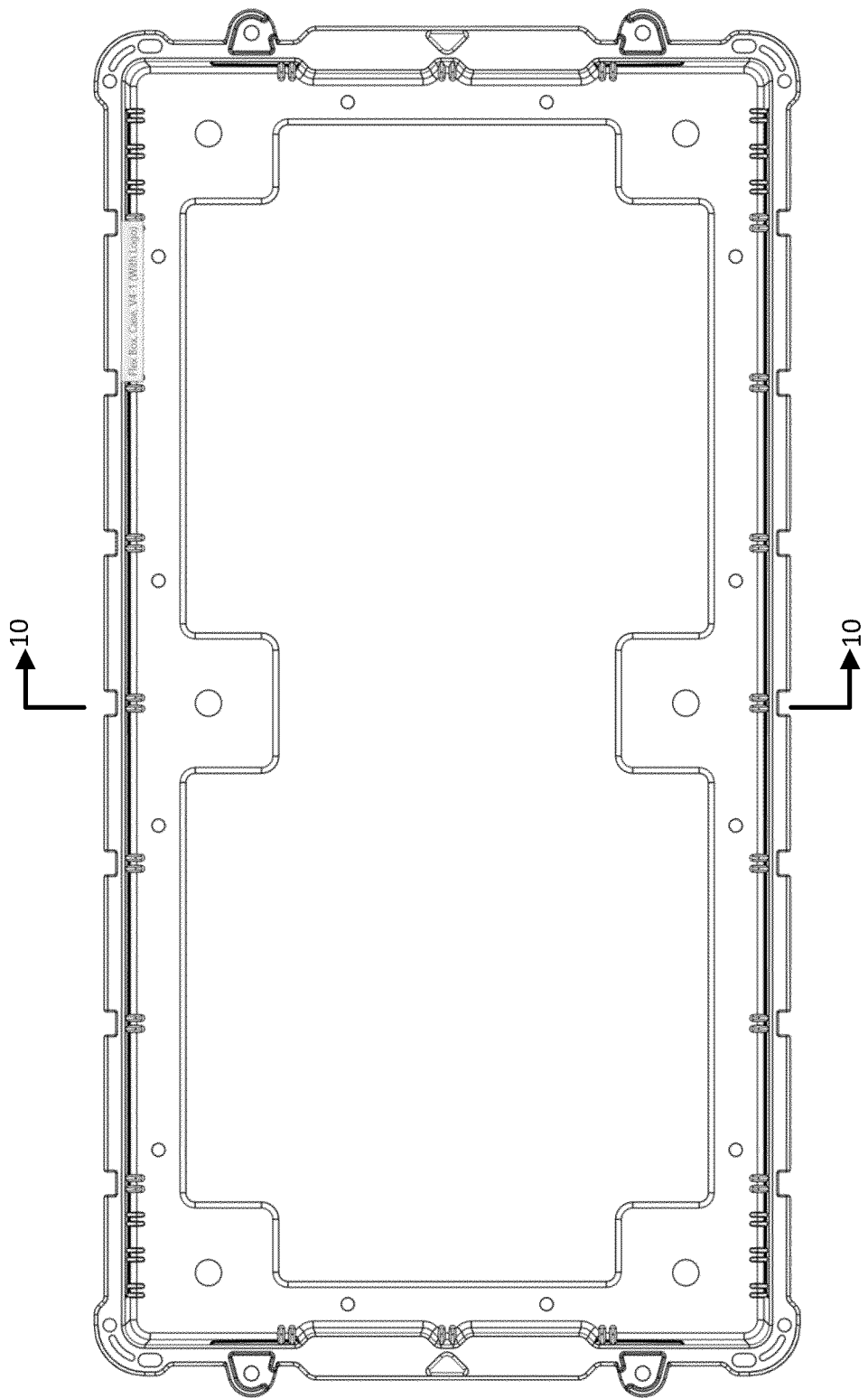
Figure 8C:
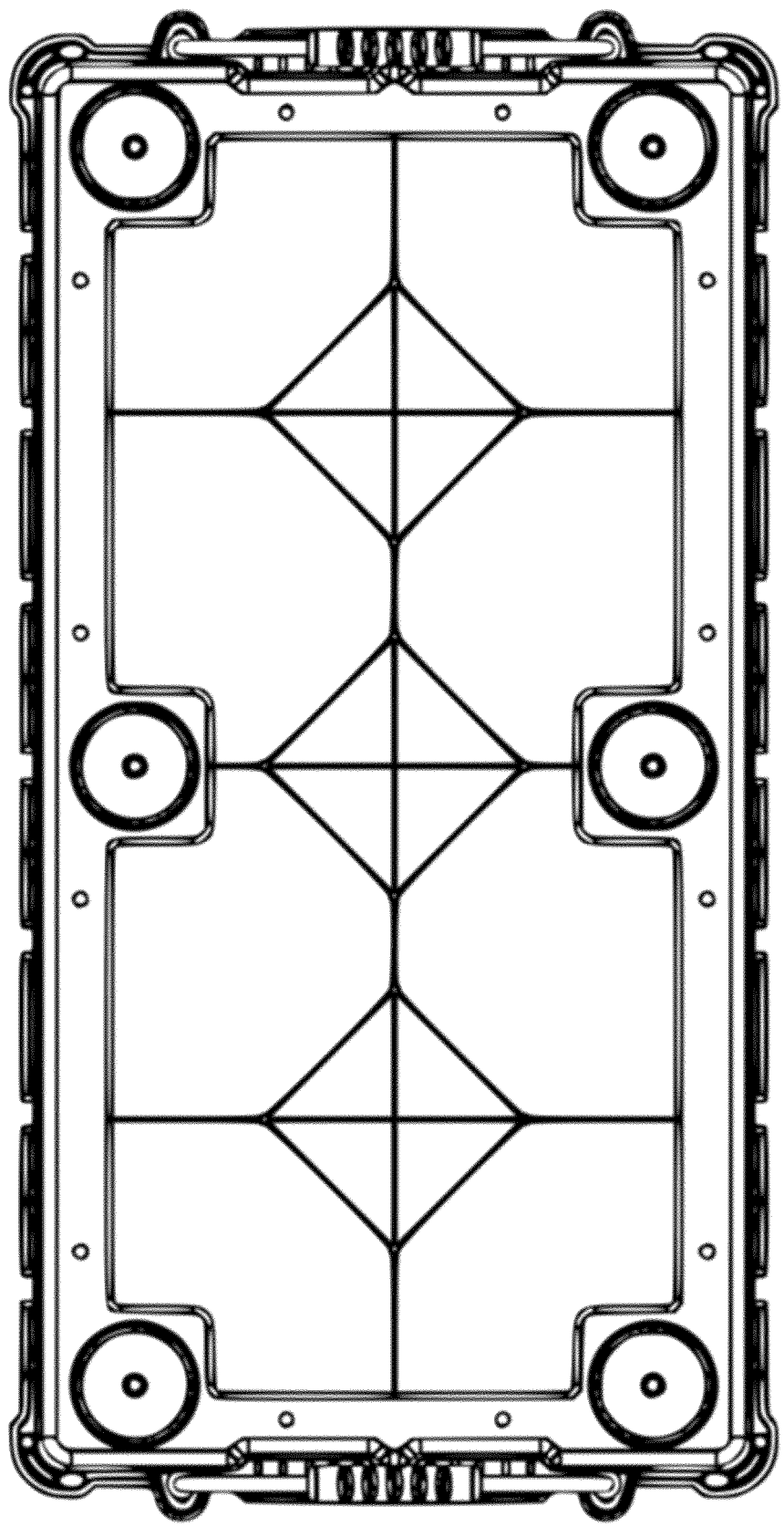
Figure 8D:
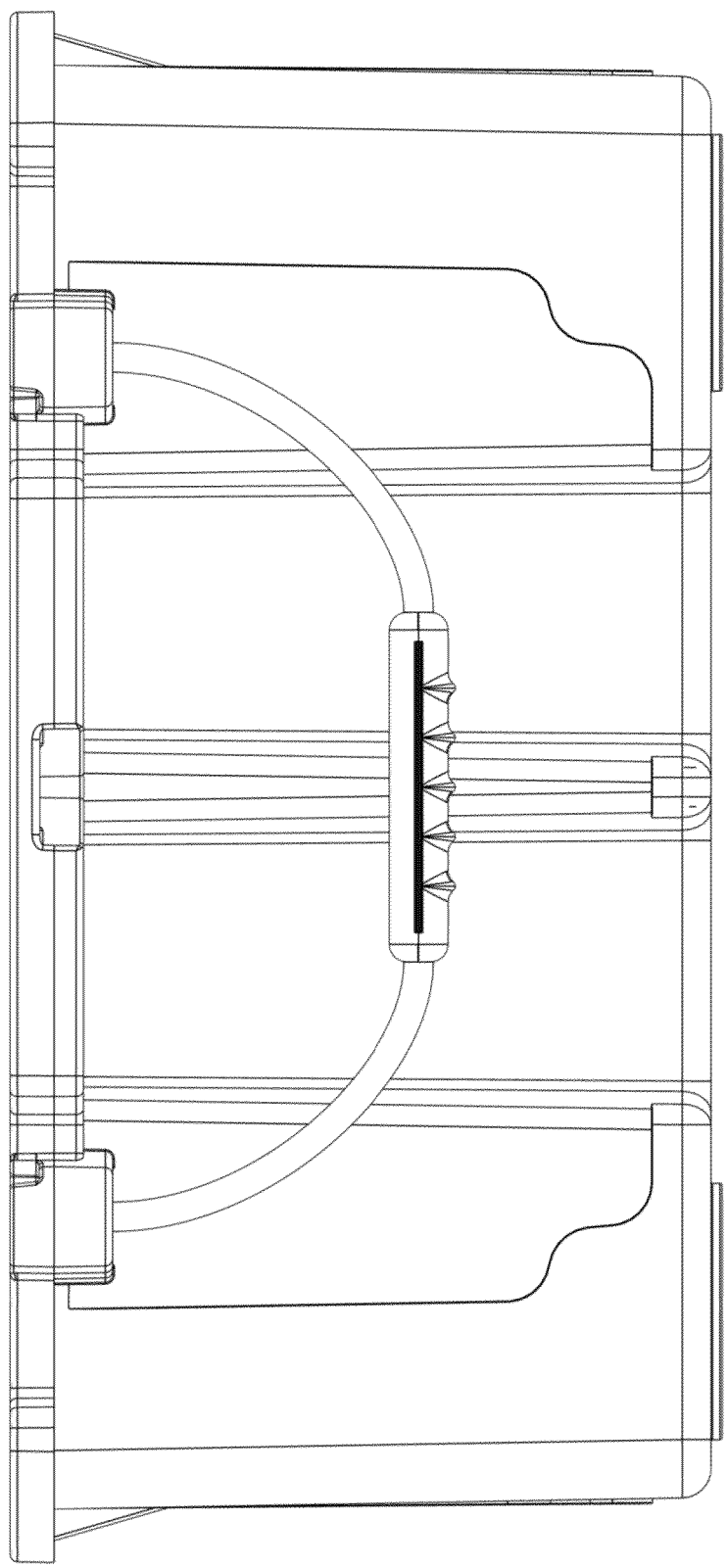
Figure 8E:
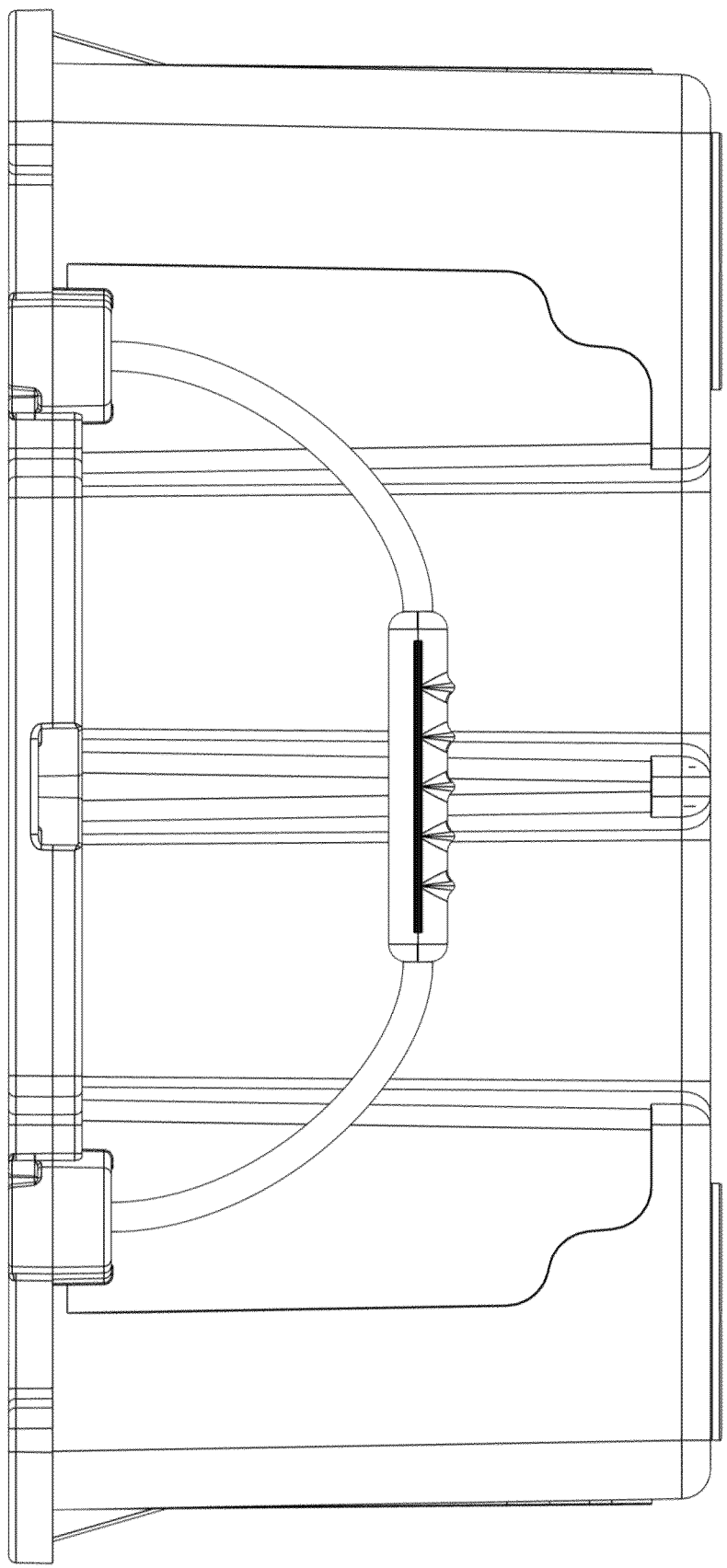
Figure 8F:
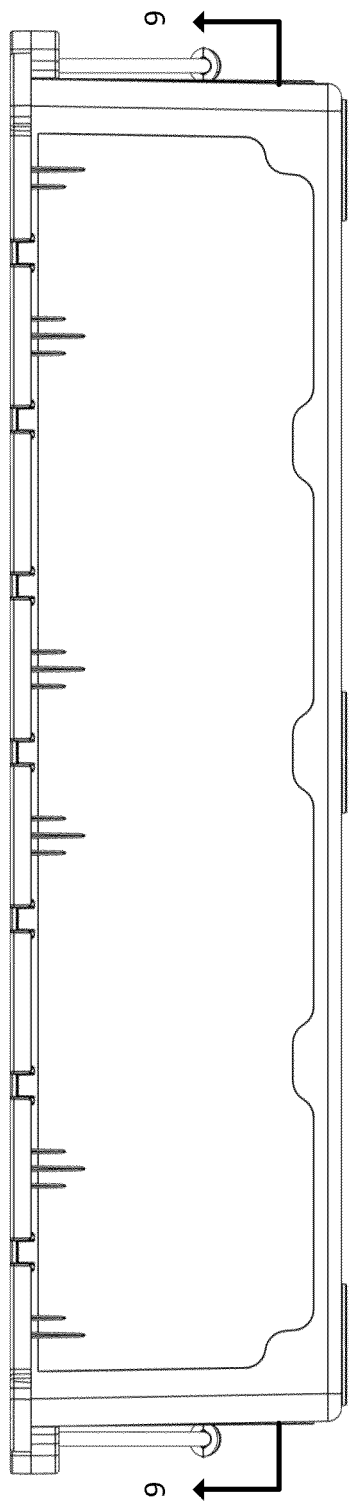
Figure 8G:
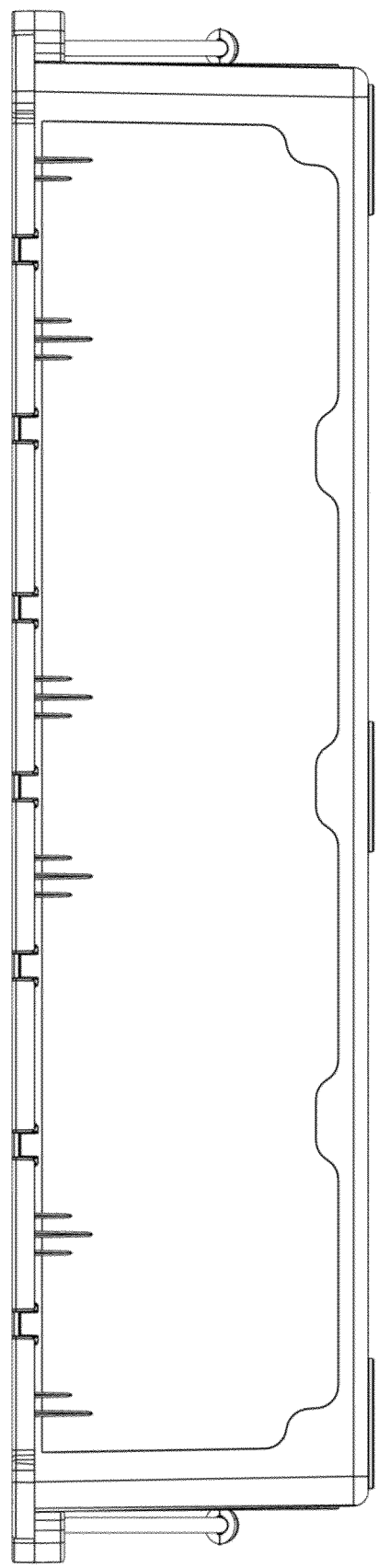
Figure 9:
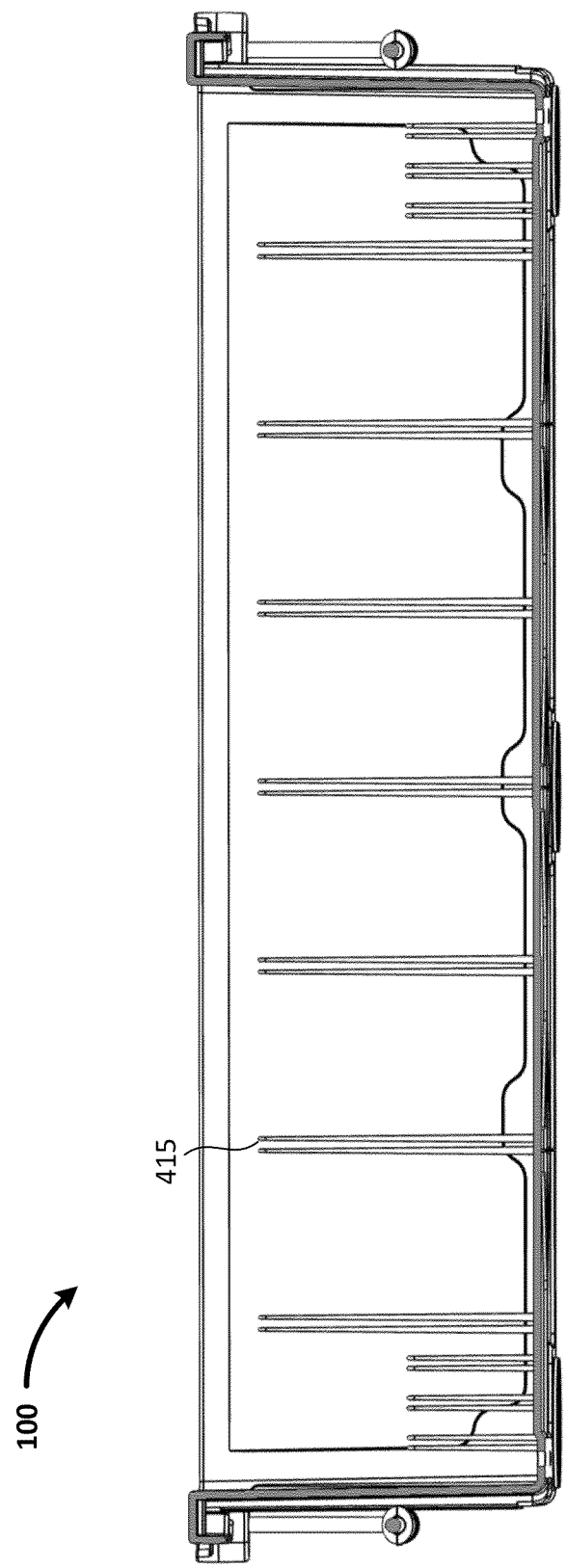
FIG. 9 and FIG. 10 show cross-section views along a front-end and a right-side of the exemplary repositionable storage container as described in FIGS. 5-11G.
Figure 10:
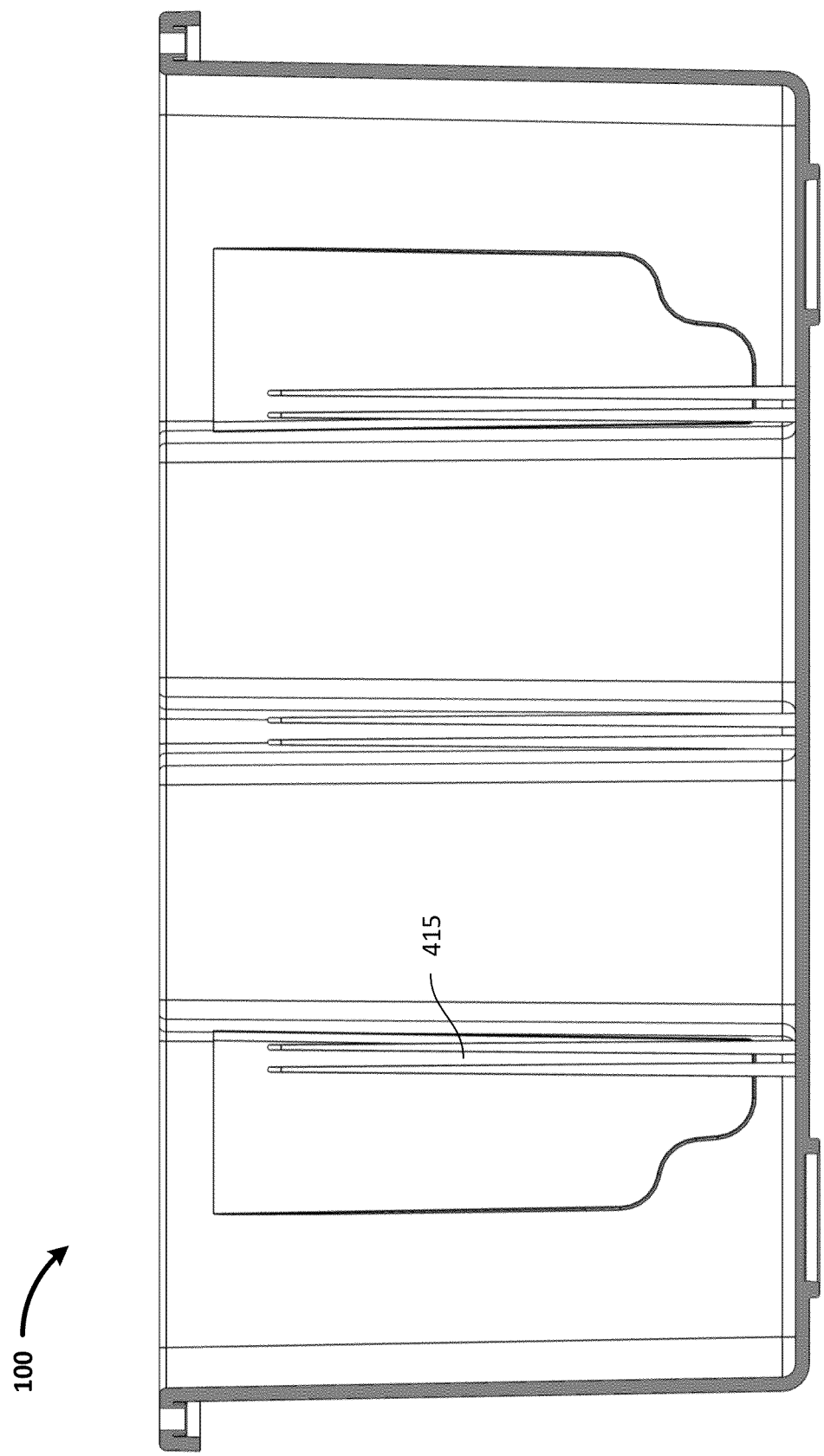

FIG. 9 and FIG. 10 show cross-section views along a front-end and a right-side of the exemplary repositionable storage container as described in FIGS. 8A-8G. As shown, the inner surface of the RSC 100 includes a plurality of divider insertion channels 415. In some implementations, the divider insertion channels 415 may be tapered. For example, the divider insertion channels 415 may be wider near the top and narrower near the bottom of the RSC 100. In various embodiments, the tapered divider insertion channels 415 may facilitate insertion of the repositionable dividers 115 while preventing the repositionable dividers 115 from popping during transportation.

FIG. 11A, FIG. 11B, FIG. 11C, FIG. 11D, FIG. 11E, FIG. 11F, and FIG. 11G show a perspective view, a top view, a bottom view, a front view, a back view, a left-side view, and a right-side view, respectively, of an exemplary repositionable divider 115. In some implementations, the length of the repositionable divider 115 may be multiple of 11.5" wide and 11.5" long to fit a gas canister of 10"×10" size. In some examples, the repositionable divider 115 may be 0.150"-0.2" thick to provide substantial strength to contain the cargo in a compartment defined by the repositionable divider 115.

Figure 11A:
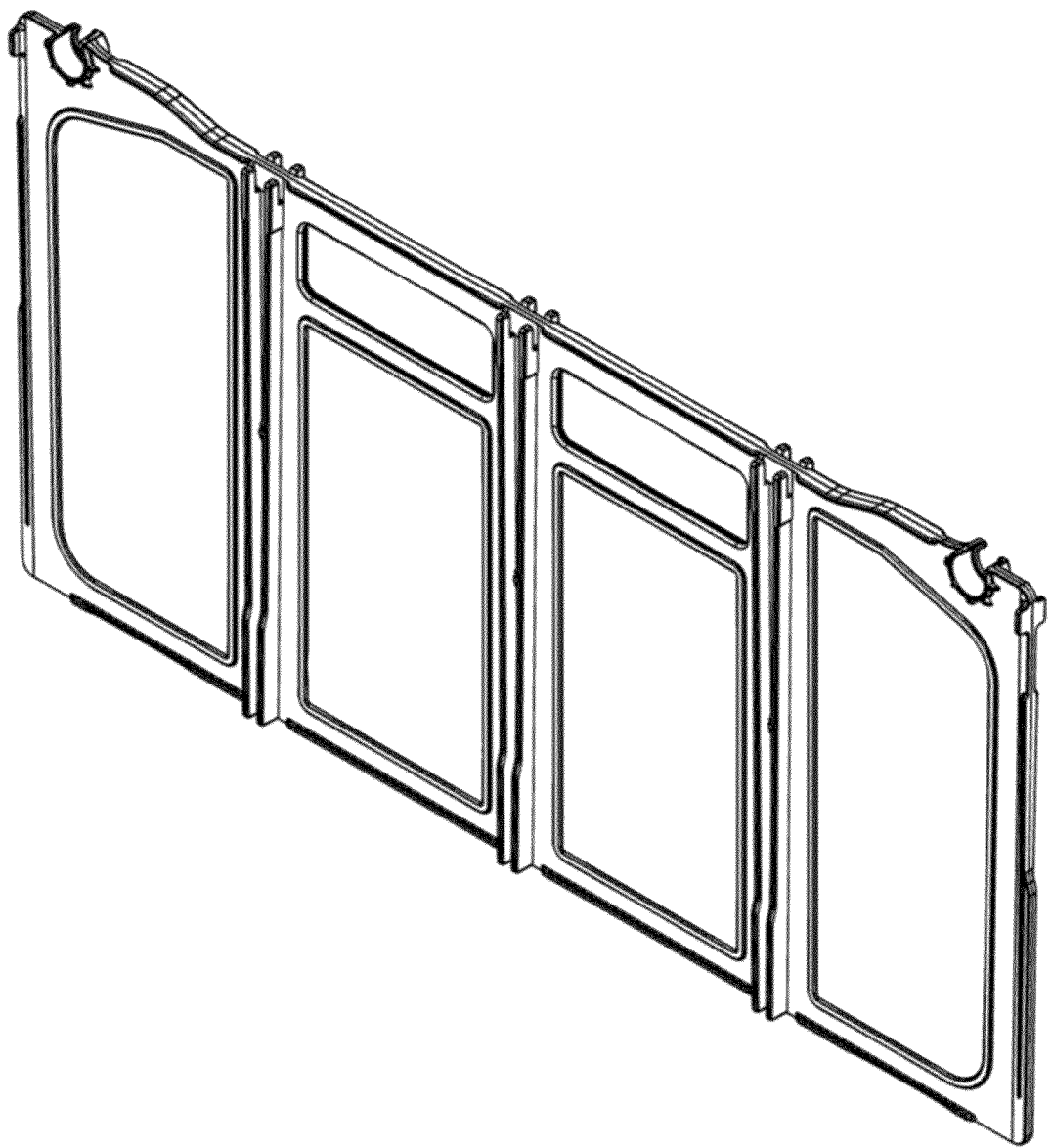
FIG. 11A, FIG. 11B, FIG. 11C, FIG. 11D, FIG. 11E, FIG. 11F, and FIG. 11G show a perspective view, a top view, a bottom view, a front view, a back view, a left-side view, and a right-side view, respectively, of an exemplary long repositionable divider (e.g., divider 115).
Figure 11B:
Figure 11C:
Figure 11D:
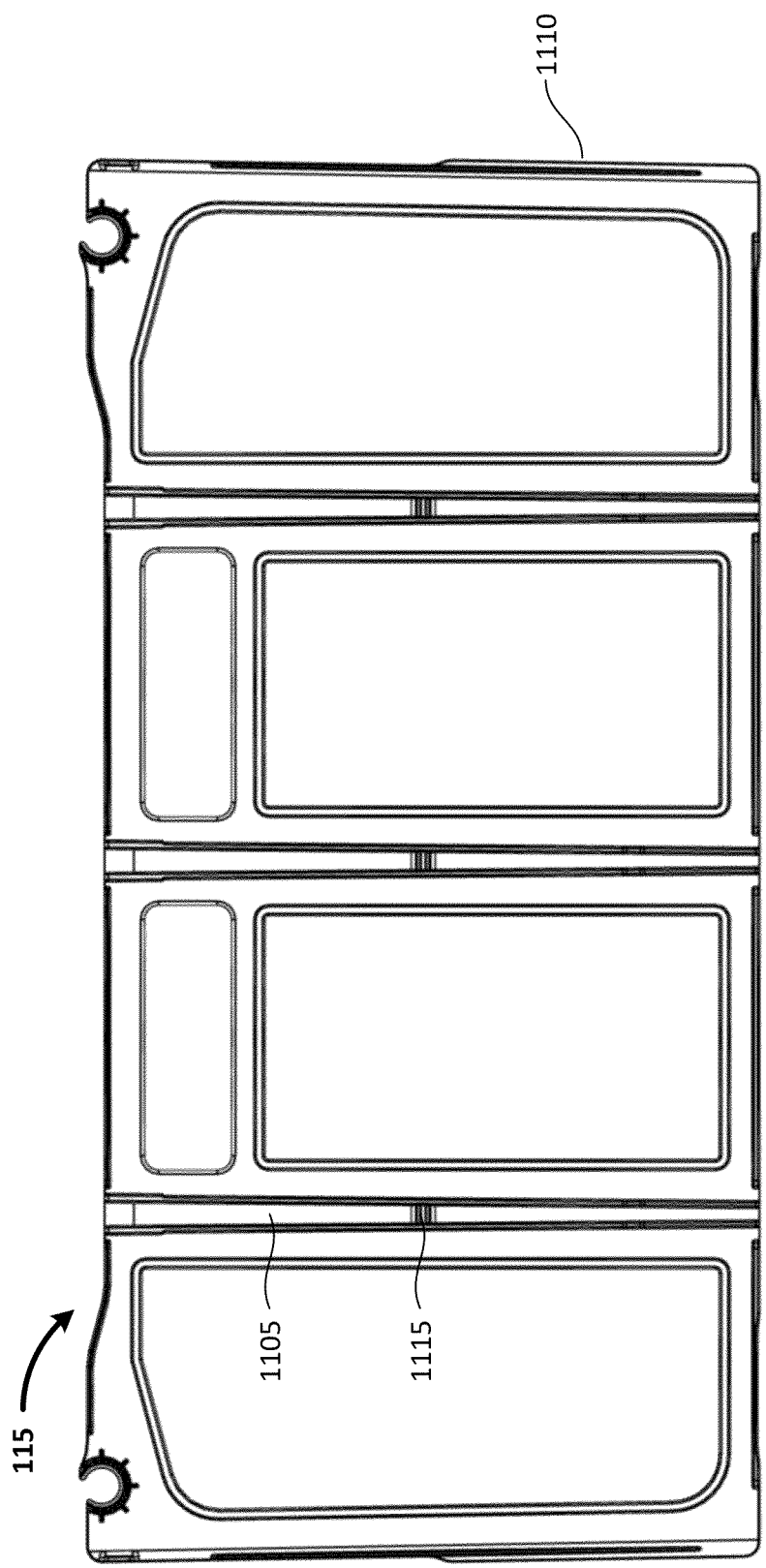
Figure 11E:
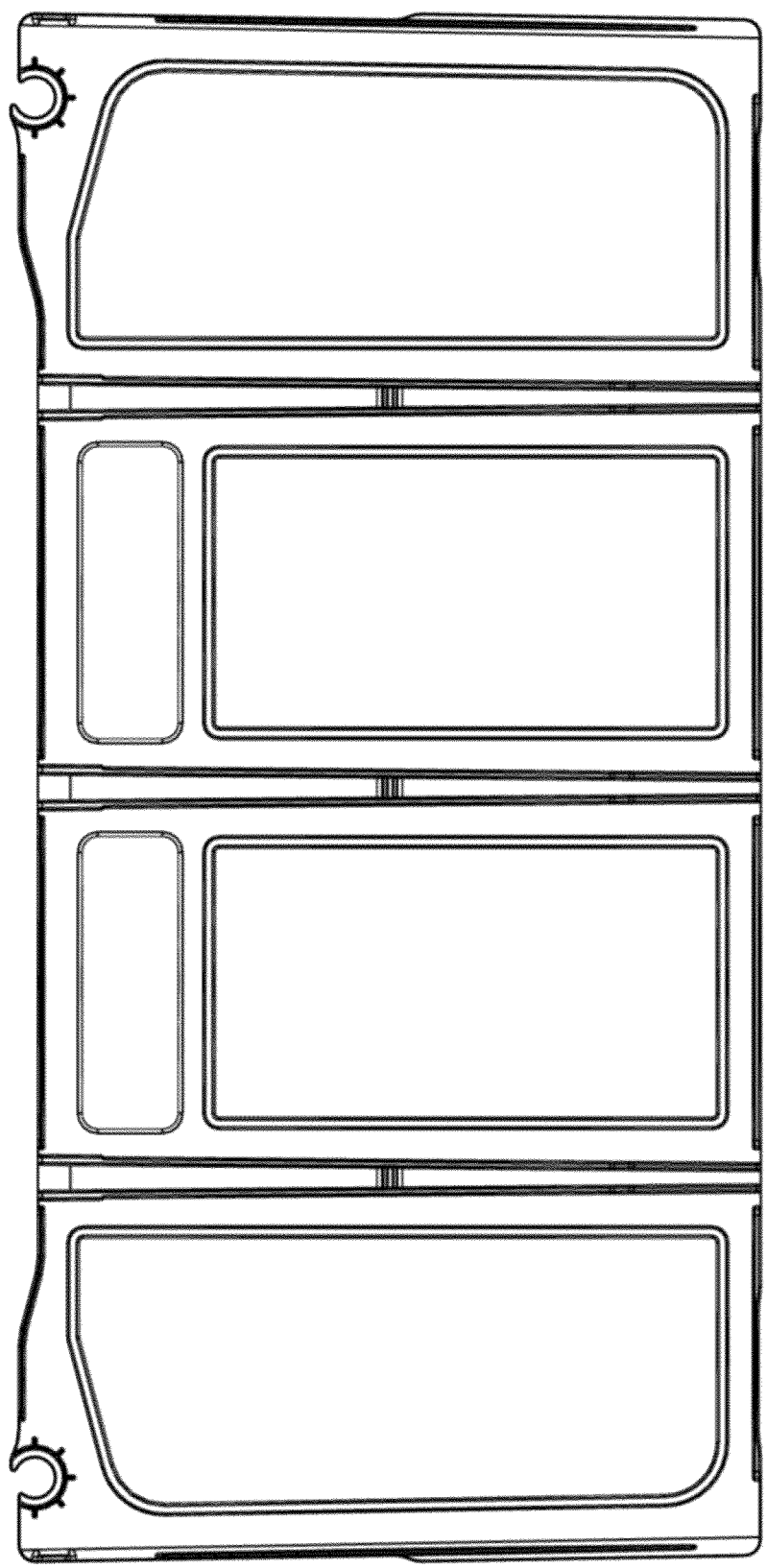

As shown in FIG. 11D, the repositionable divider 115 includes three divider insertion channels 1105. For example, a user may insert an additional repositionable divider 115 perpendicular to the repositionable divider 115 into one of the divider insertion channels 1105. Accordingly, the user may create compartments of various sizes and orientations in the RSC 100.

The repositionable divider 115 includes draft angle slides 1110 at its opposite edge. For example, the draft angle slides 1110 may be used to lock into another repositionable divider 115 perpendicularly into position. In this example, each of the divider insertion channels 1105 includes an engagement rib 1115. For example, the engagement rib 1115 may be located substantially midway of the divider insertion channel 1105. In some examples, the engagement rib 1115 may be located at or below 45% of height of the divider insertion channel 1105.

In various embodiments, the draft angle slides 1110 may include engagement features to latch into the engagement rib 1115. For example, a first repositionable divider 115 may be perpendicularly snap locks into a second repositionable divider 115 by engaging the draft angle slides 1110 of the first repositionable divider 115 to the engagement rib 1115 of the second repositionable divider 115.

Figure 11F:
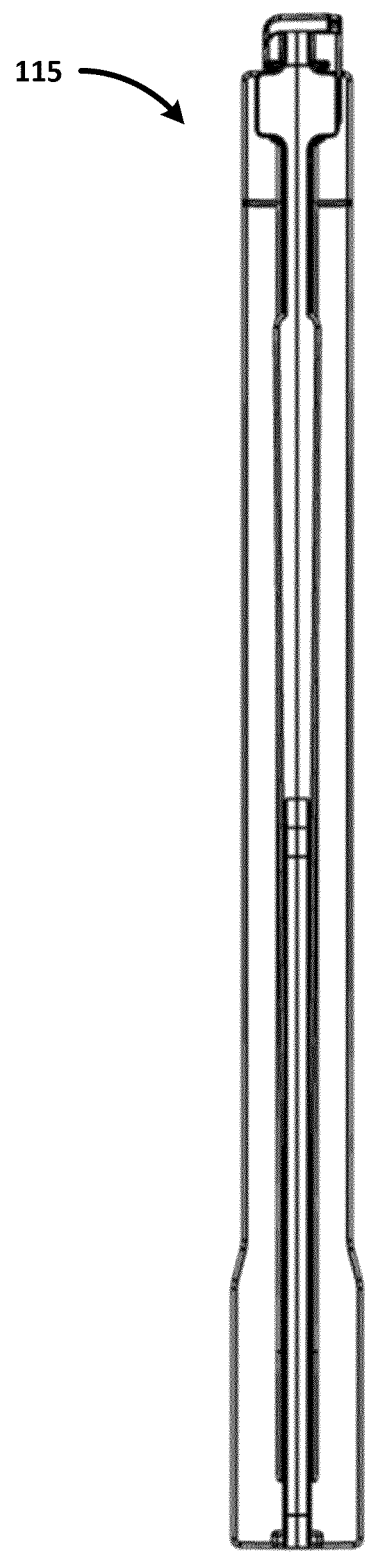
Figure 11G:
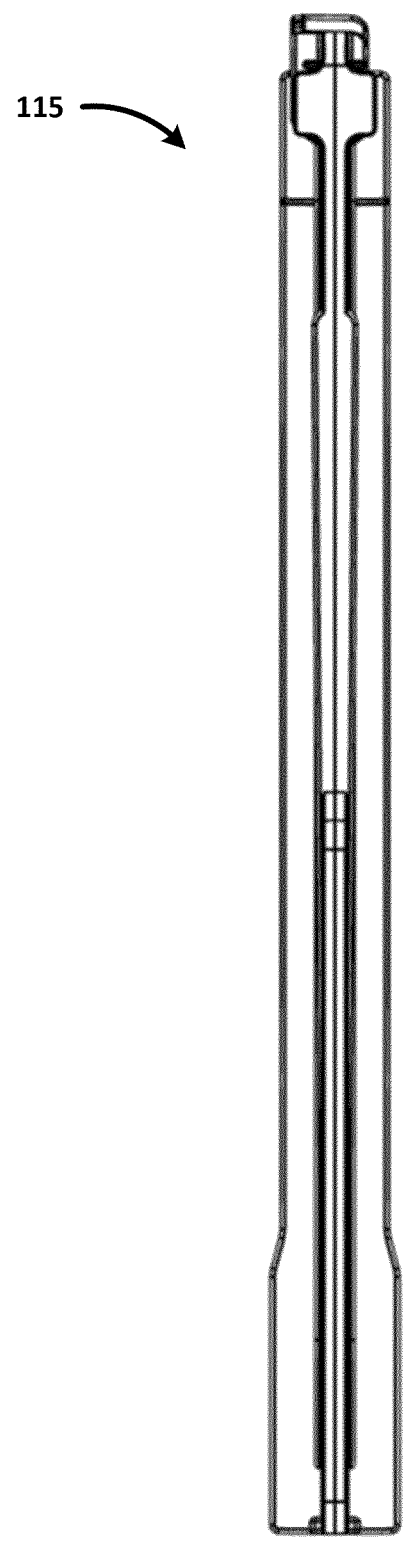
Figure 12A:
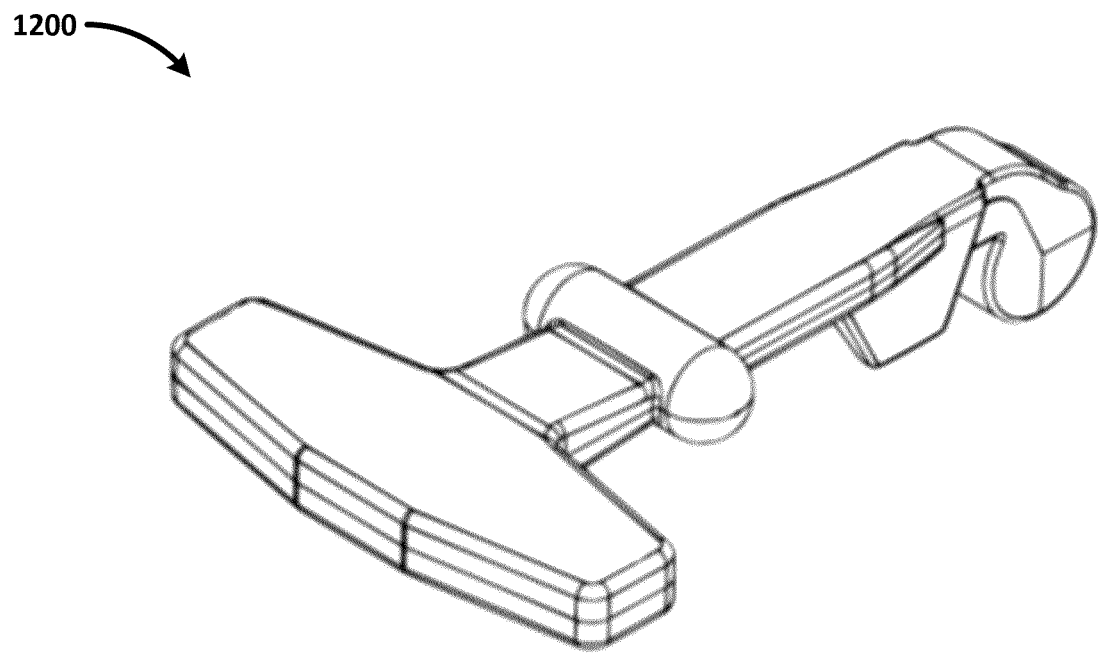
FIG. 12A, FIG. 12B, FIG. 12C, FIG. 12D, FIG. 12E, FIG. 12F, and FIG. 12G show a perspective view, a top view, a bottom view, a front view, a back view, a left-side view, and a right-side view, respectively, of an exemplary container reinforcing coupler.
Figure 12B:
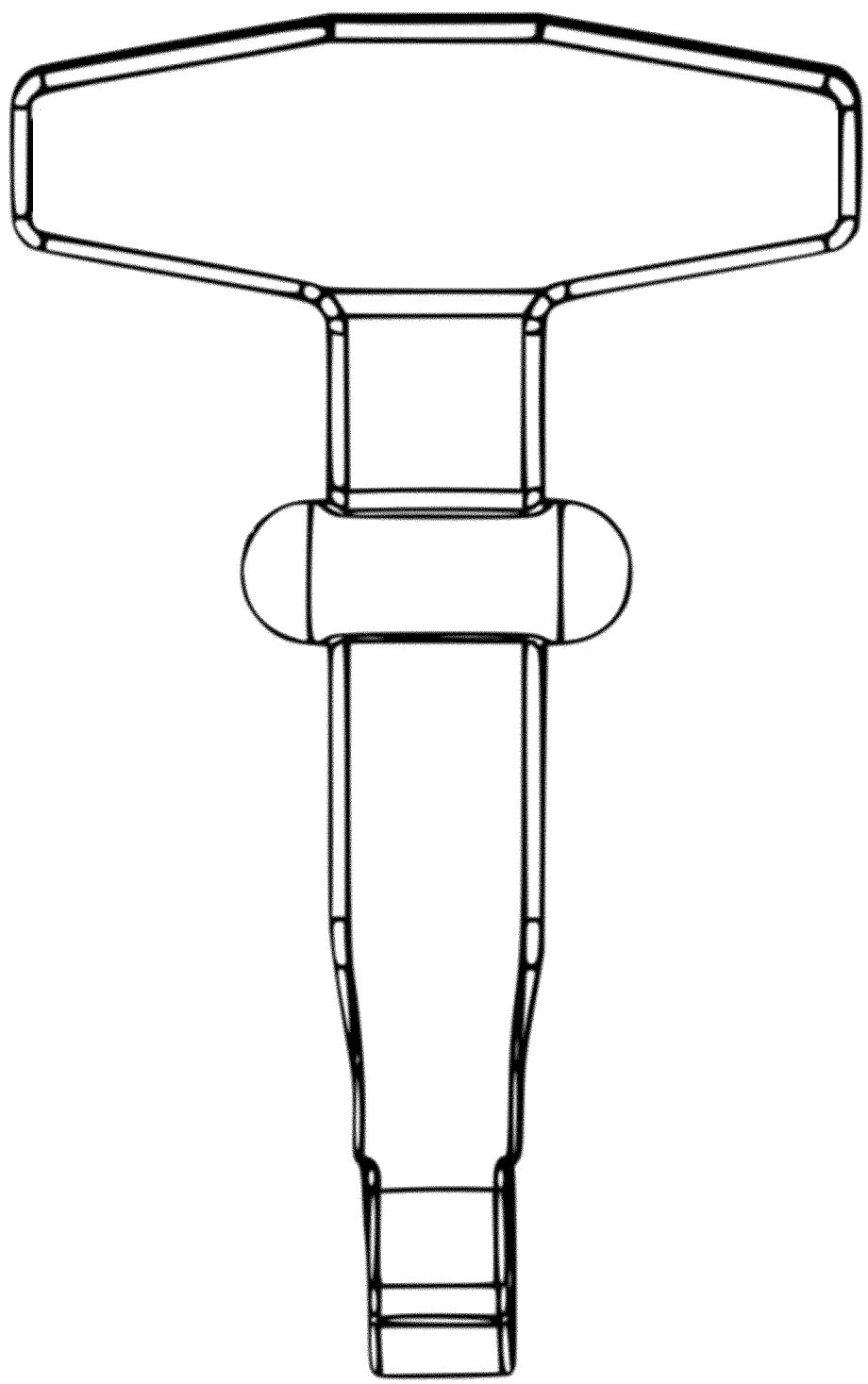
Figure 12C:
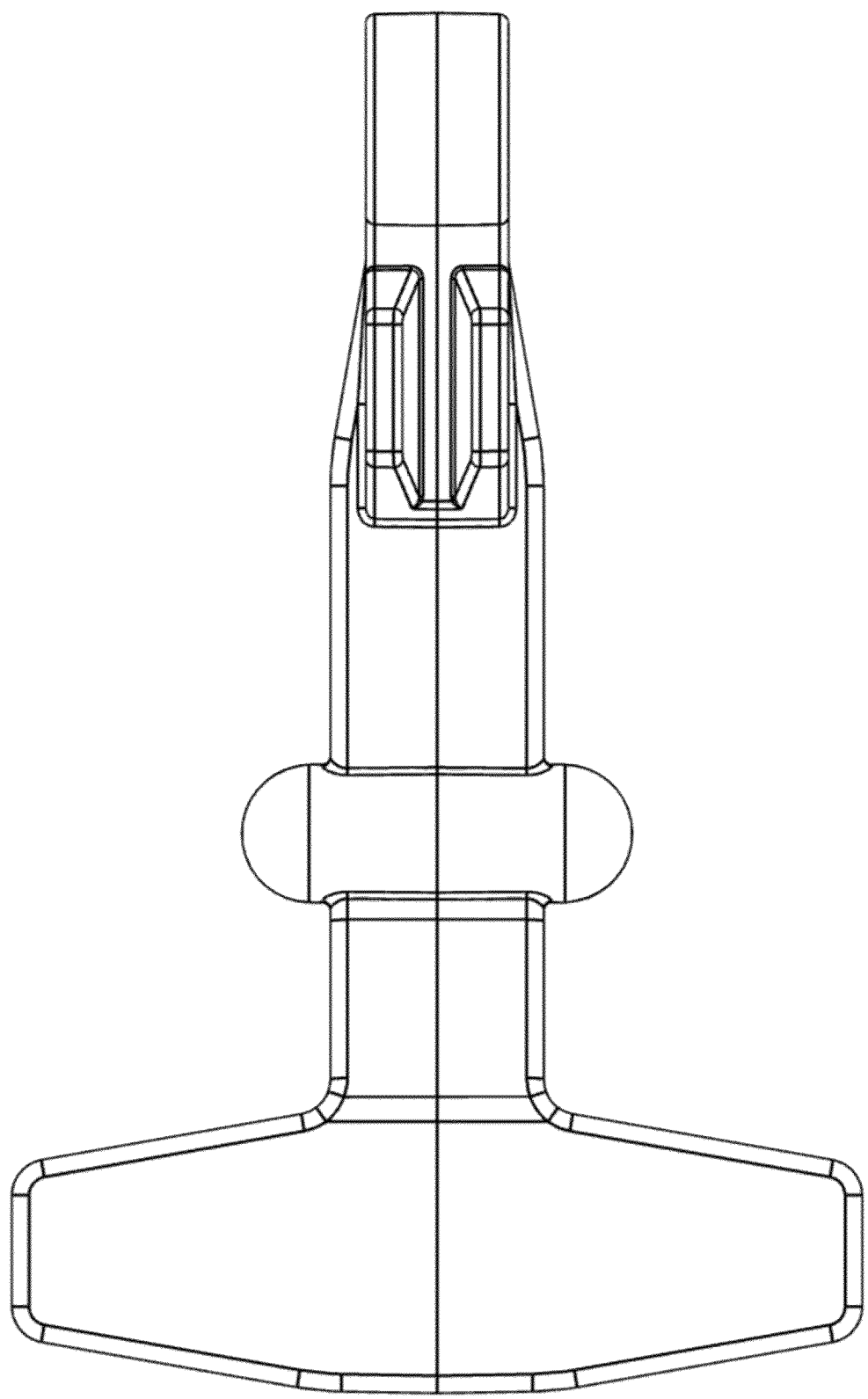
Figure 12D:
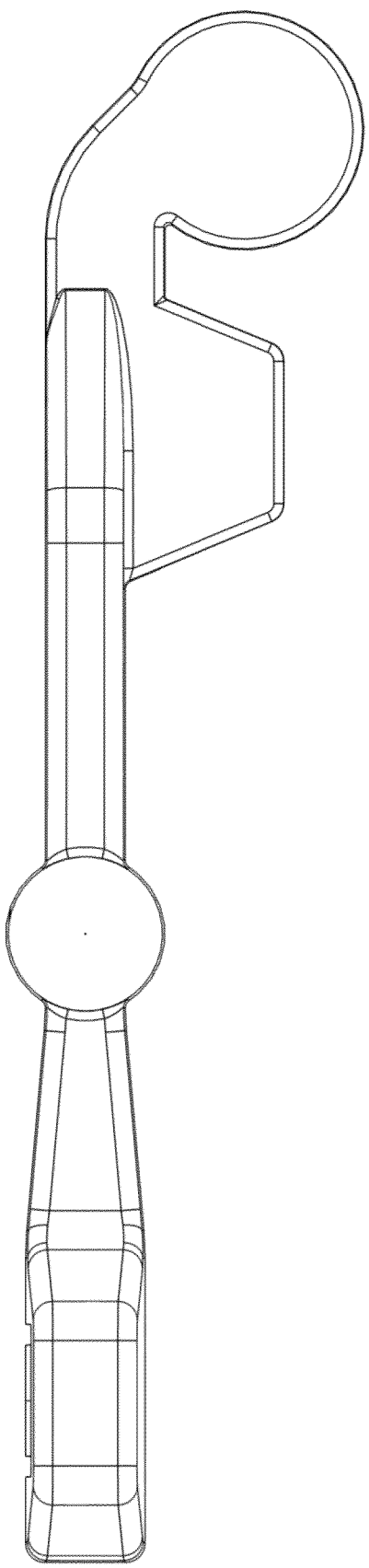
Figure 12E:
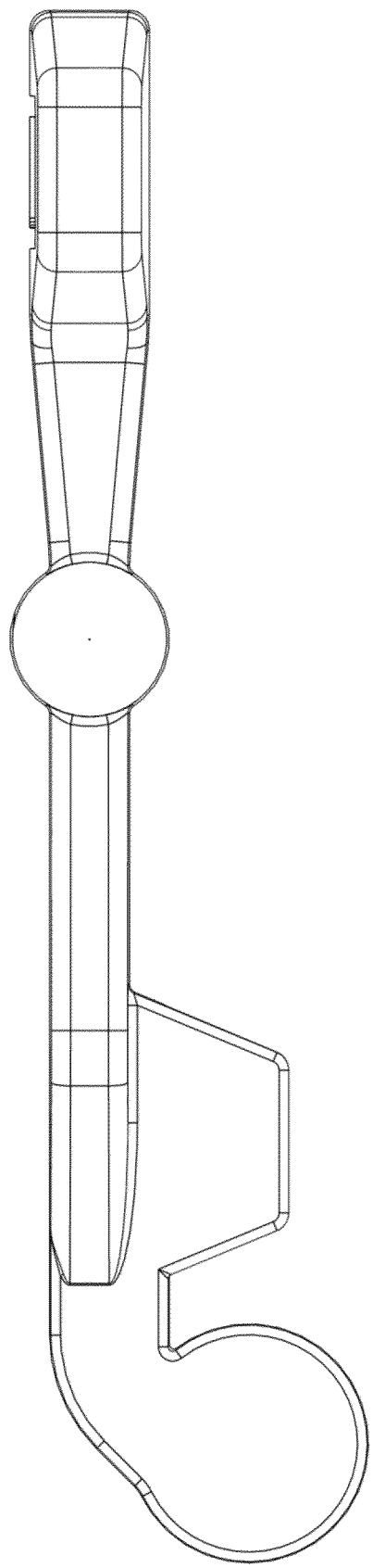
Figure 12F:
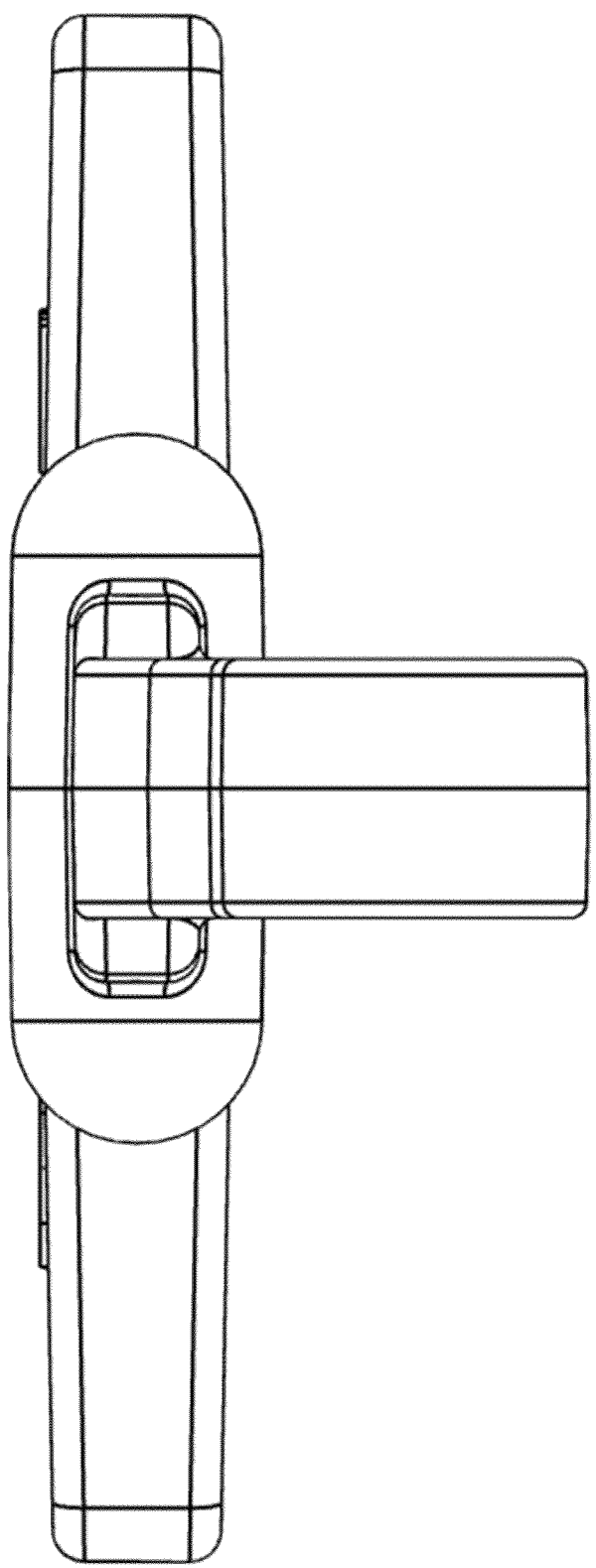
Figure 12G:
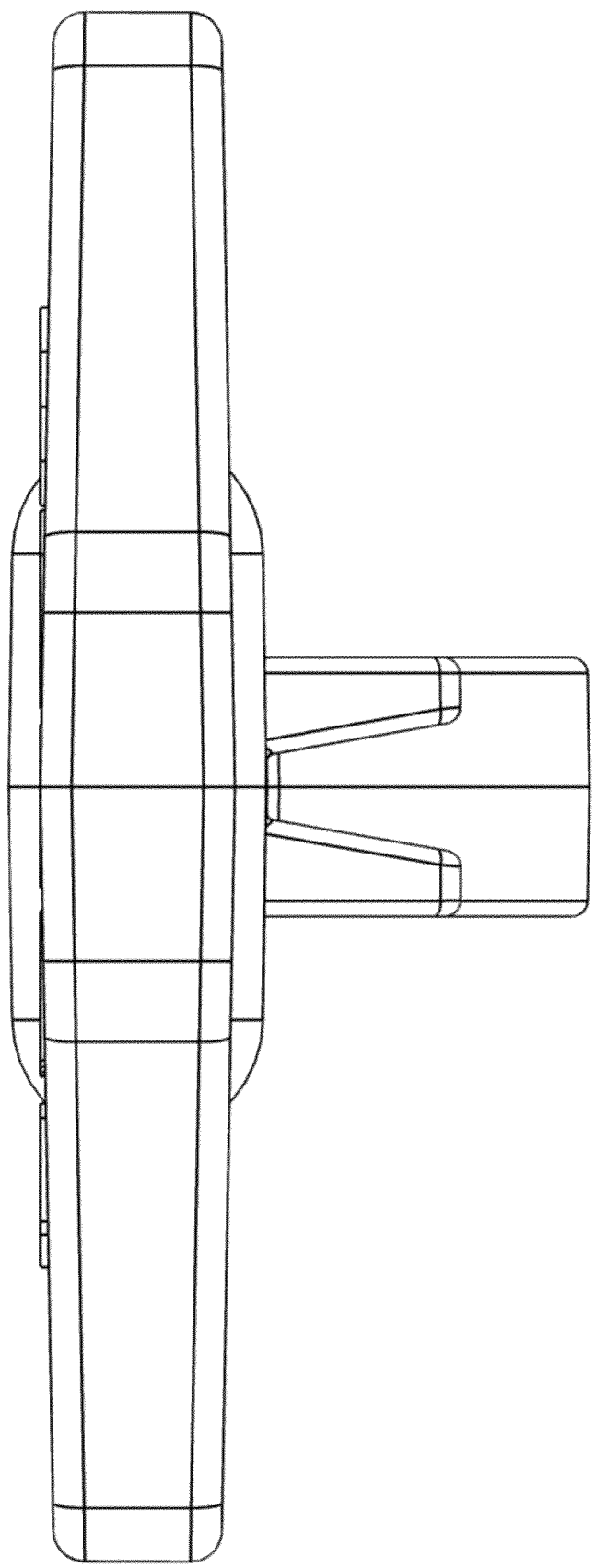

As shown in FIGS. 11F-G, the repositionable divider 115 is also tapered in thickness. In the depicted example, the repositionable divider 115 is thicker near the bottom than near the top. In some examples, when latched, the thicker bottom of the repositionable divider 115 may exert a tension force at the insertion channels 1105 or the insertion channel 415. For example, the tension force may reinforce the side wall 410 and the repositionable dividers 115. In various embodiments, a combination of the engagement rib 1115, the draft angle slides 1110, and the tapered reposition divider 115 may securely latch the reposition divider 115 into the side walls and/or another reposition divider 115, preventing the reposition divider 115 from popping during transportation.

FIG. 12A, FIG. 12B, FIG. 12C, FIG. 12D, FIG. 12E, FIG. 12F, and FIG. 12G show a perspective view, a top view, a bottom view, a front view, a back view, a left-side view, and a right-side view, respectively, of an exemplary container reinforcing coupler 1200 (e.g., coupler 120).

Figure 13:
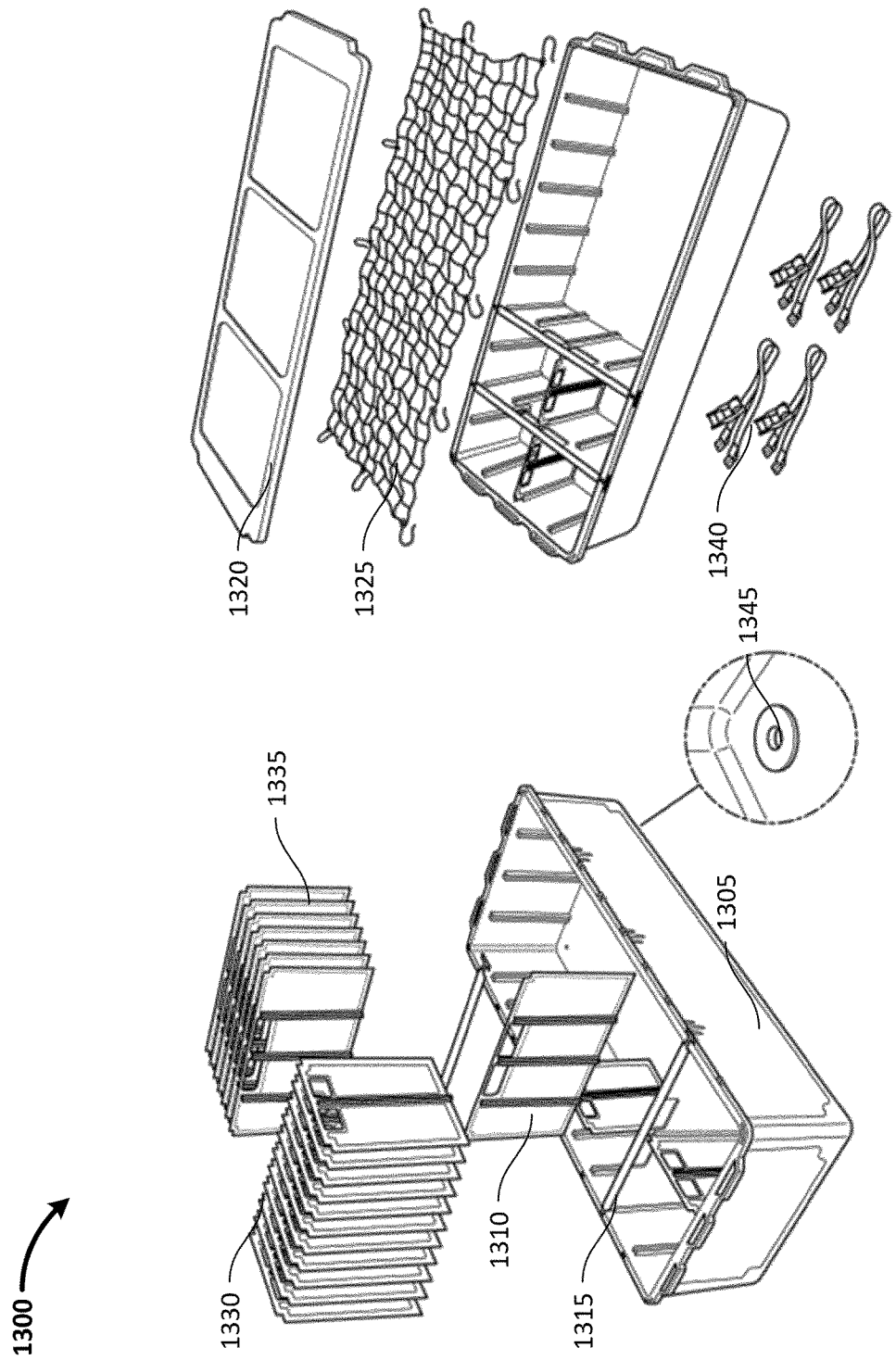
FIG. 13 shows an exemplary collection of various components applicable to an exemplary repositionable storage container.

FIG. 13 shows an exemplary collection 1300 of various components applicable to an exemplary repositionable storage container 1305. The exemplary repositionable storage container 1305 may house multiple repositionable dividers 1310 in sets. The set of the dividers may, for example, be 10 dividers. The set of the dividers may, for example, be 20 dividers. The exemplary repositionable storage container 1305 may be attached with straps 1315. The straps may, for example, provide structural support to the dividers. The exemplary repositionable storage container 1305 may be covered with a lid 1320. The lid may, for example, snap onto the exemplary repositionable storage container.

The exemplary repositionable storage container 1305 may be covered by a cargo net 1325. The cargo net may provide for structural support to objects stored within the exemplary repositionable storage container. The exemplary repositionable storage container 1305 may be divided by short repositionable dividers 1330. The exemplary repositionable storage container 1305 may be divided by long repositionable dividers 1335. The short repositionable dividers 1330 and long repositionable dividers 1335 may, for example, couple to form sections within the exemplary repositionable storage container.

The exemplary repositionable storage container 1305 may be tied down by tie downs 1340. The exemplary component that may couple to the exemplary repositionable storage container 1305 include, as depicted, a magnetic non-skid foot 1345. Some embodiments may, for example, include a polymeric foot. The foot may, for example, be rubber. For example, the foot may be non-skid. Some non-skid feet may, by way of example and not limitation, be non-magnetic.

Figure 14:
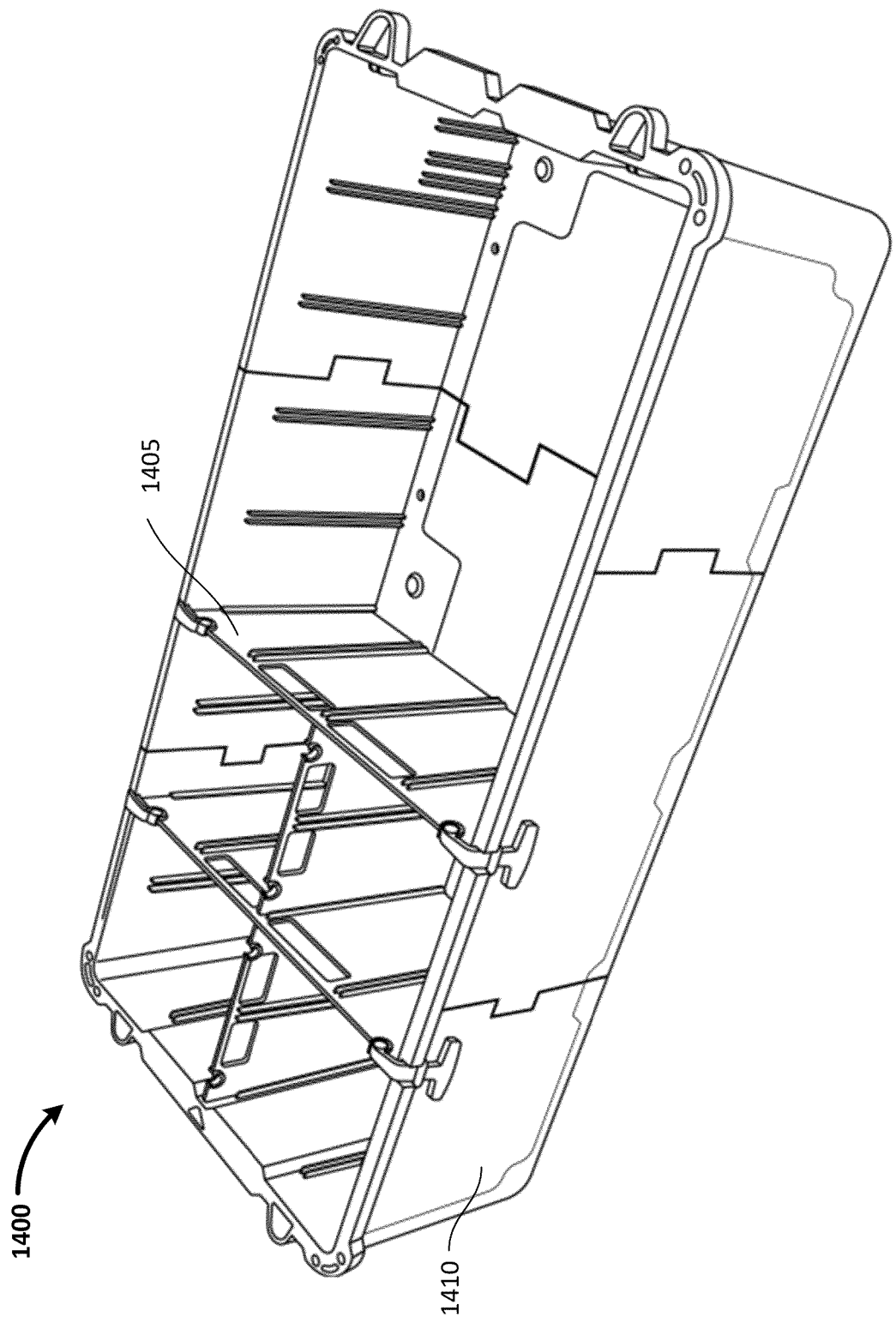
FIG. 14 shows a prototype of an exemplary container reinforcing coupler.
Figure 15A:
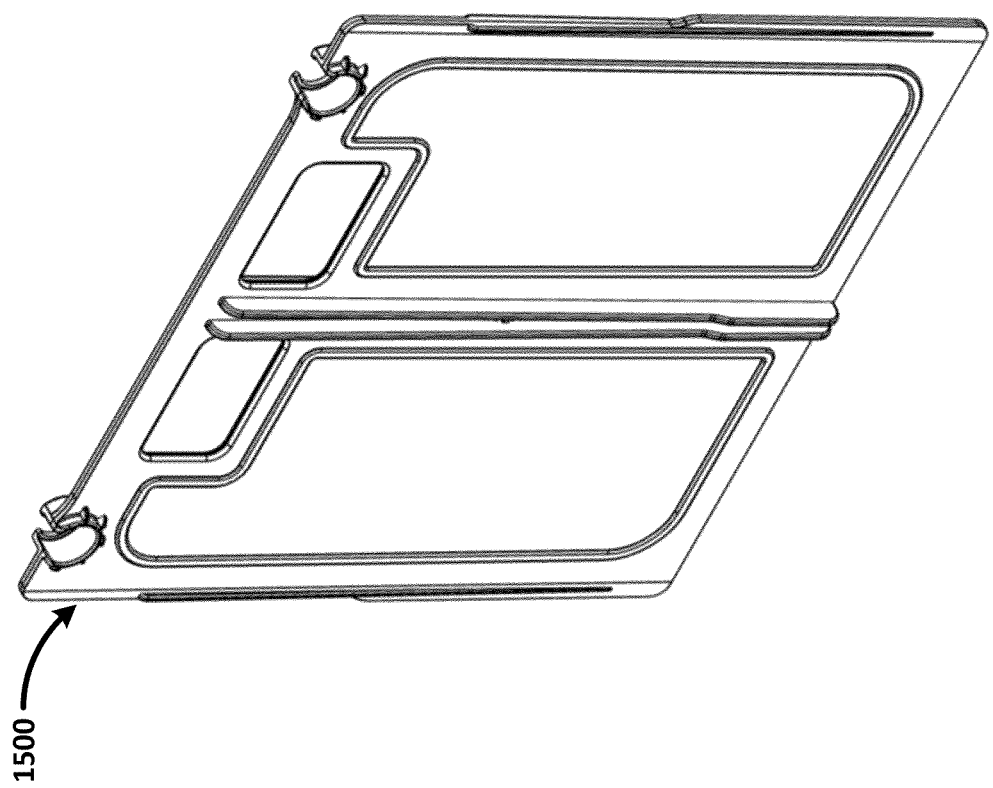
FIG. 15A, FIG. 15B, FIG. 15C, FIG. 15D, FIG. 15E, FIG. 15F, and FIG. 15G show a perspective view, a top view, a bottom view, a front view, a back view, a left-side view, and a right-side view, respectively, of an exemplary short repositionable divider.
Figure 15B:
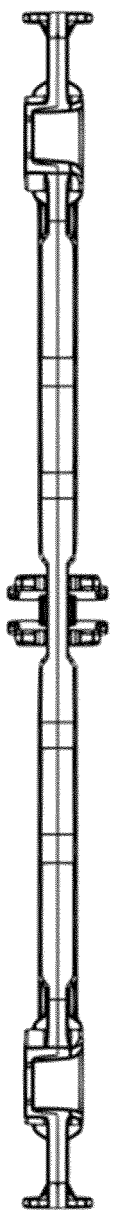
Figure 15C:
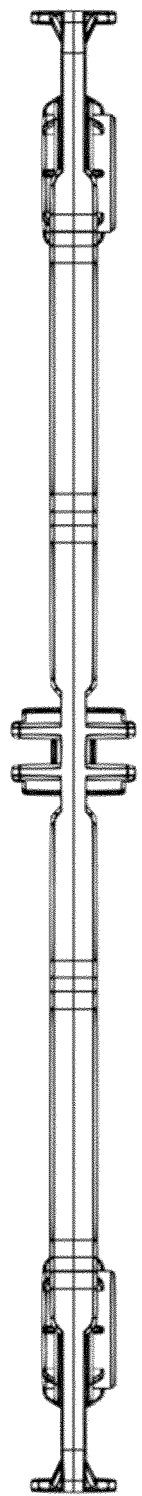
Figure 15D:
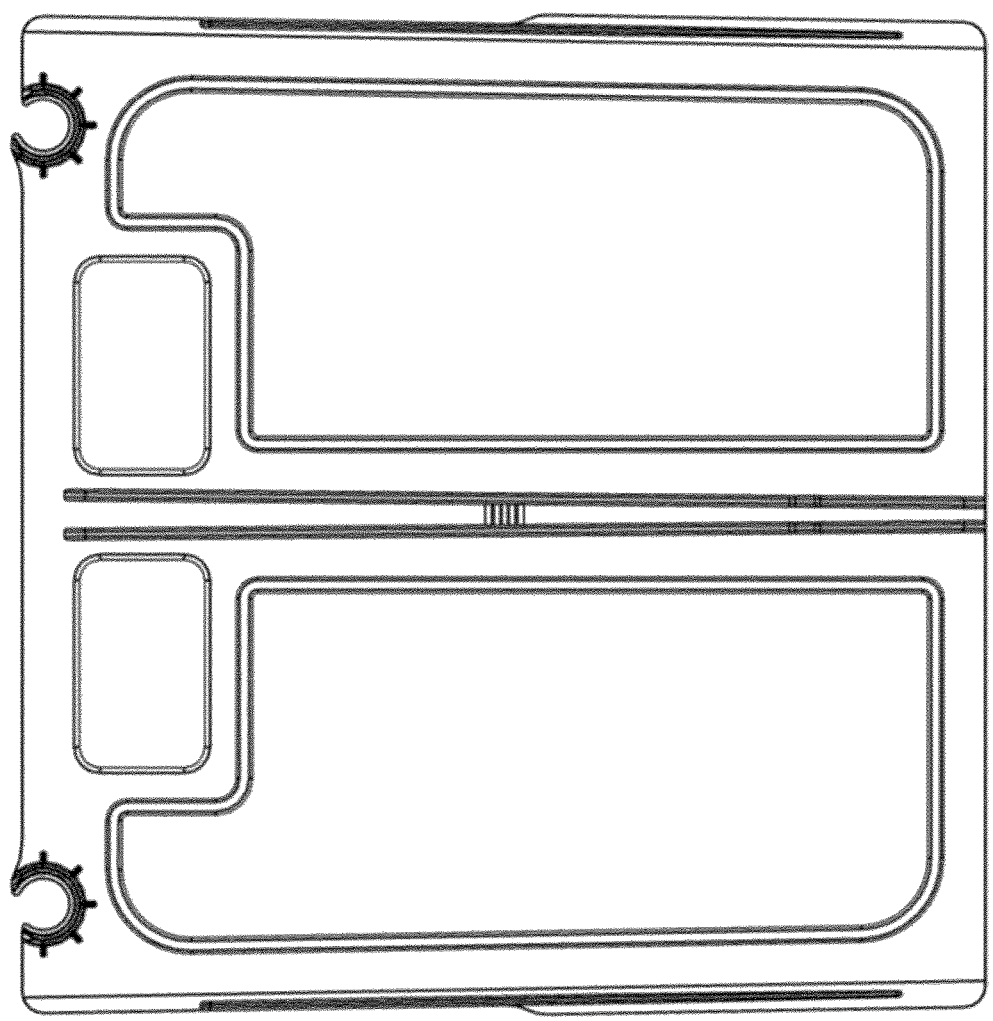
Figure 15E:
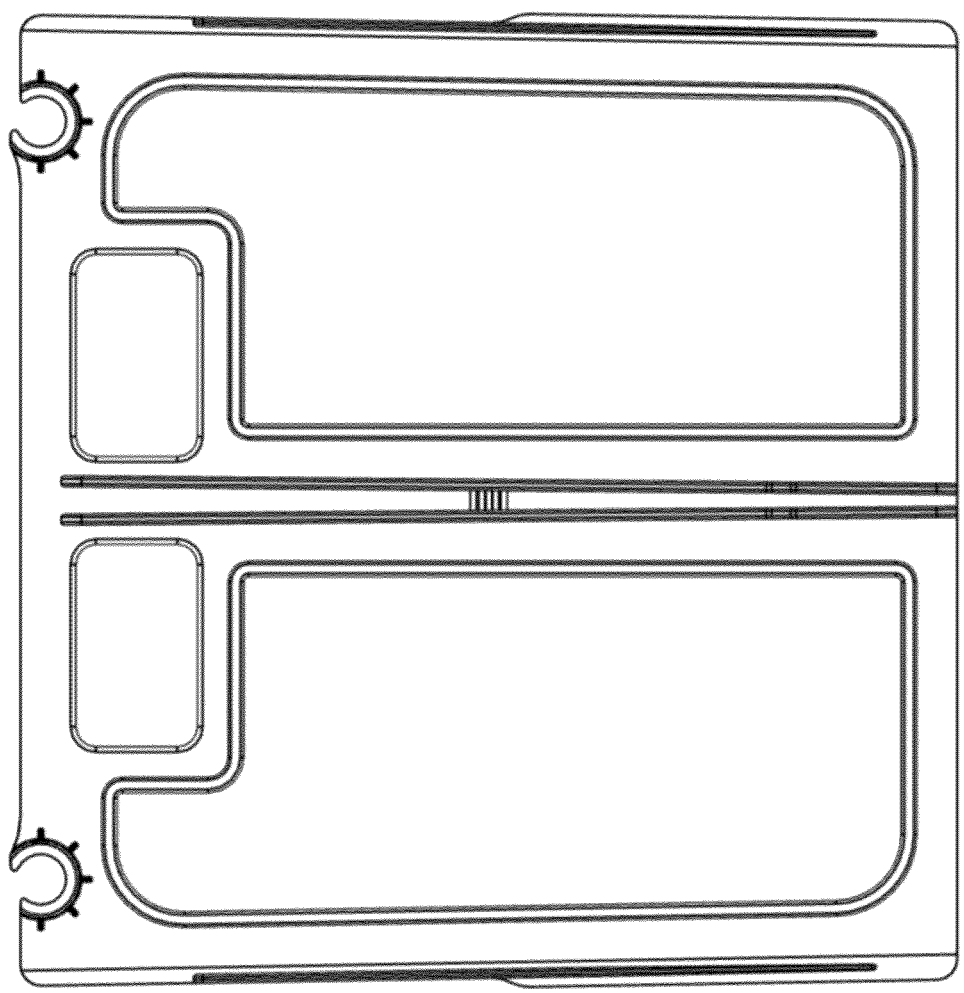
Figure 15F:
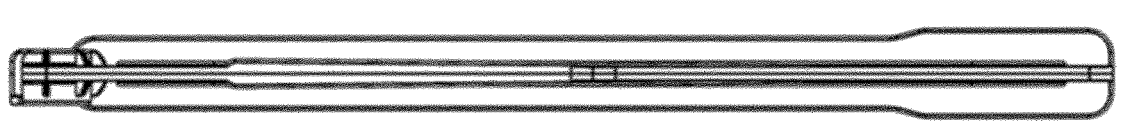
Figure 15G:
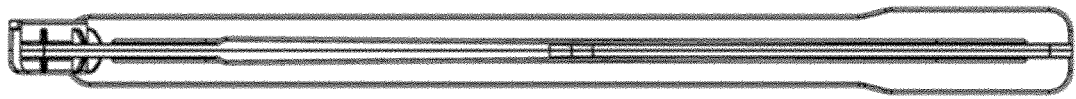
Figure 16B:
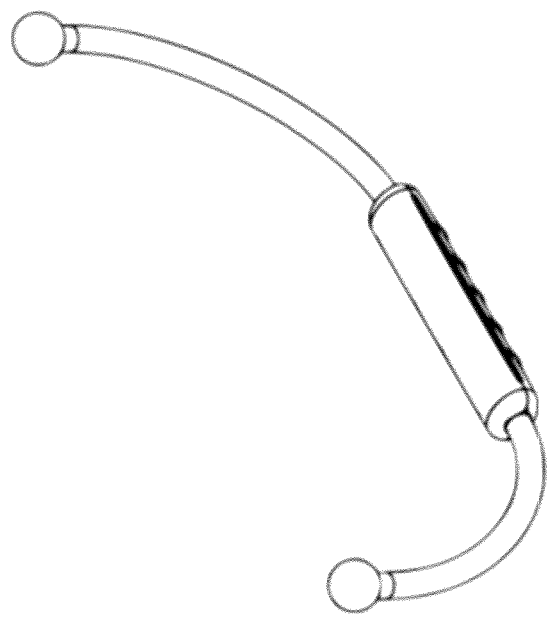
Figure 16C:
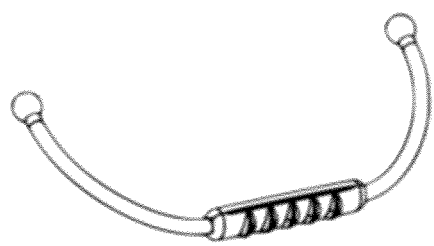
Figure 16D:
Figure 16E:
Figure 16F:
Figure 17A:
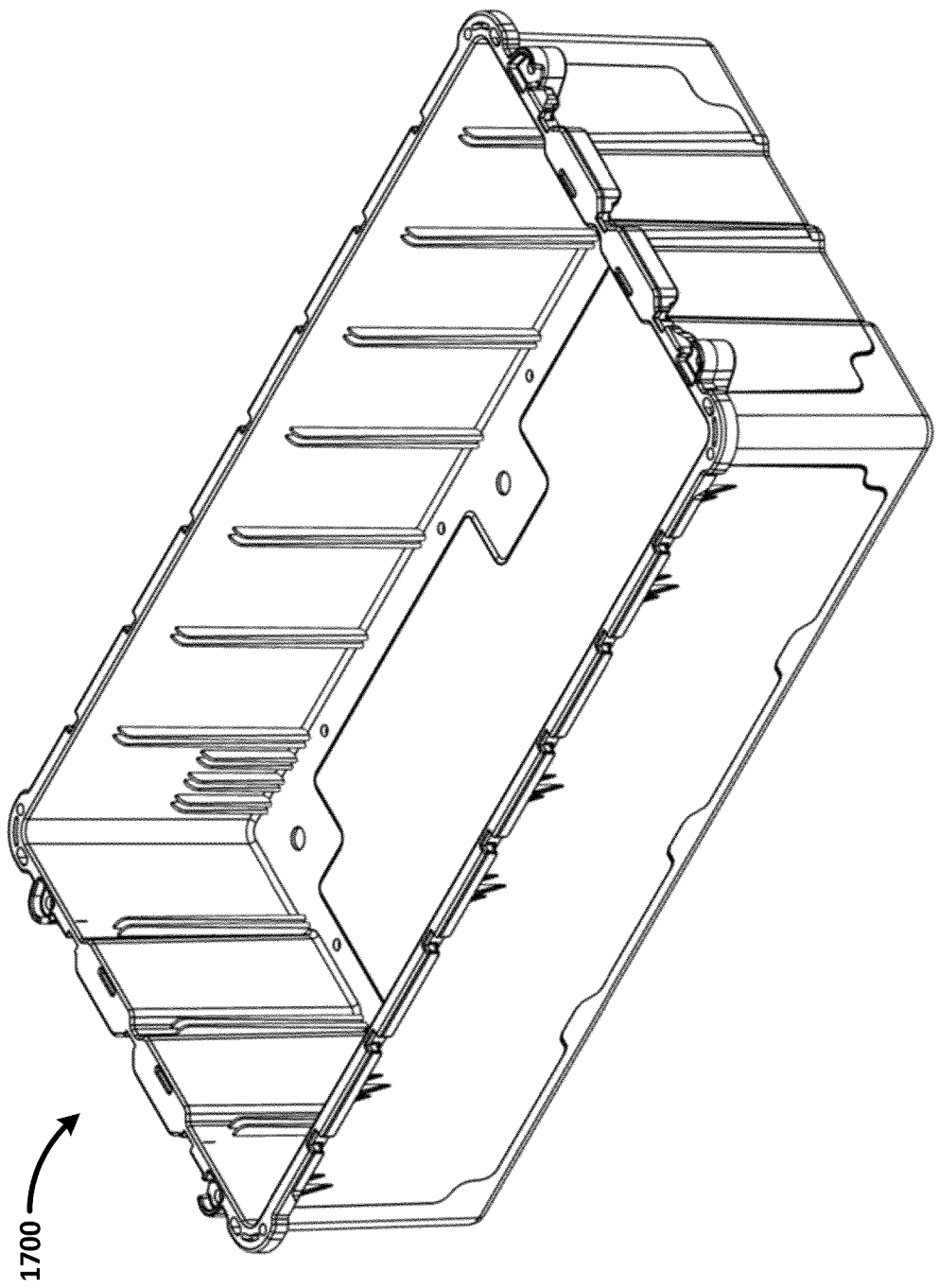
FIG. 17A, FIG. 17B, FIG. 17C, FIG. 17D, FIG. 17E, show a perspective view, a top view, a bottom view, a front view, and a left-side view, respectively, of an exemplary container.
Figure 17B:
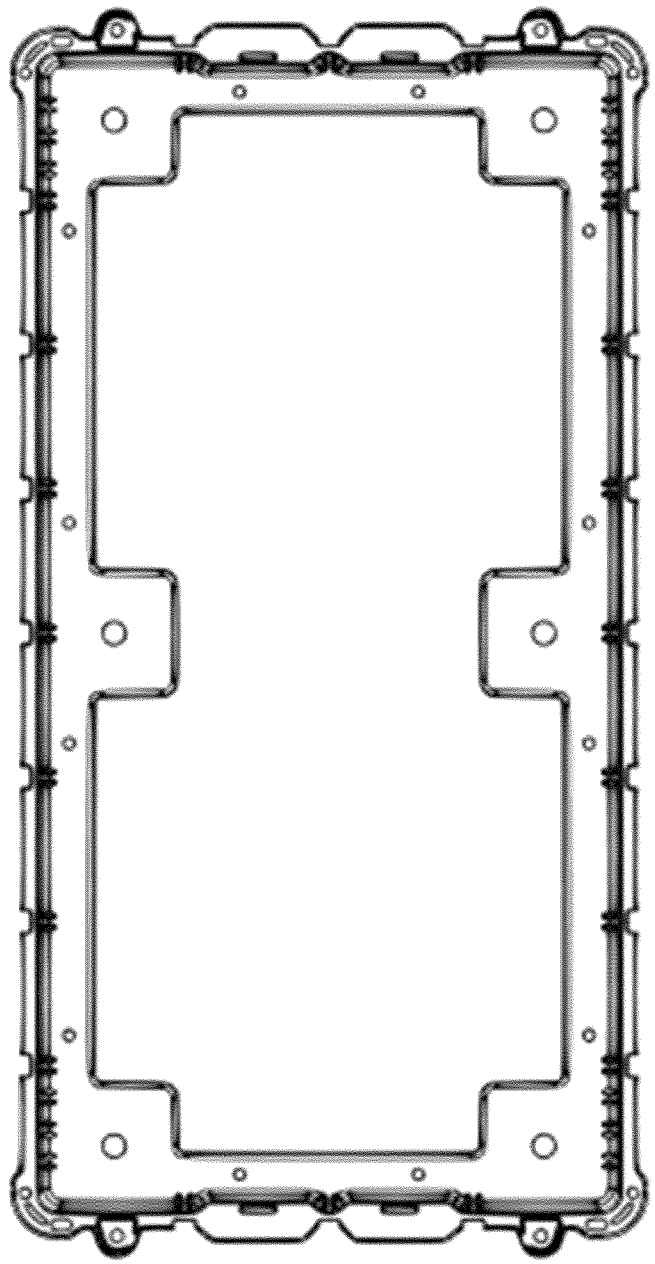
Figure 17C:
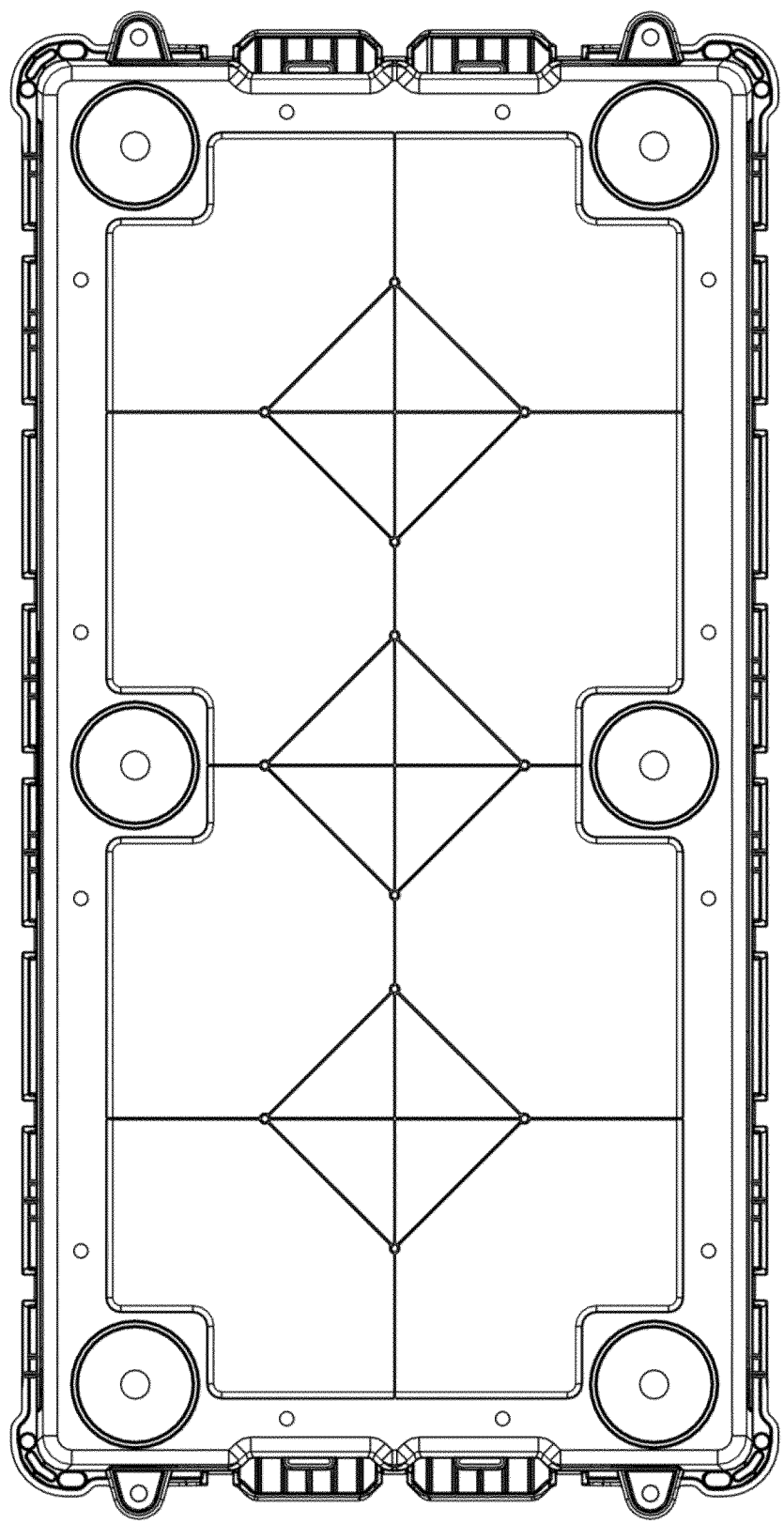
Figure 17D:
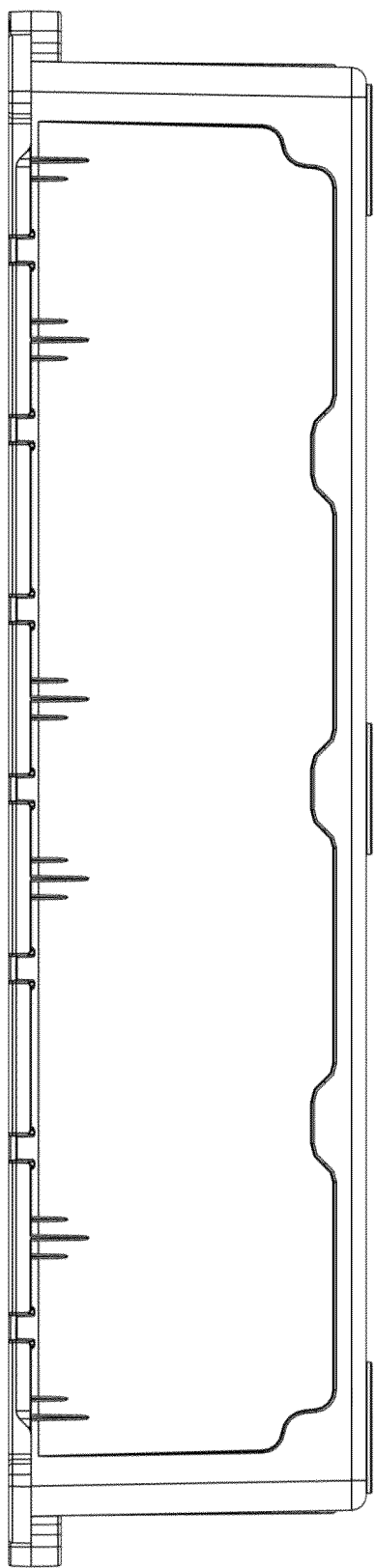
Figure 17E:
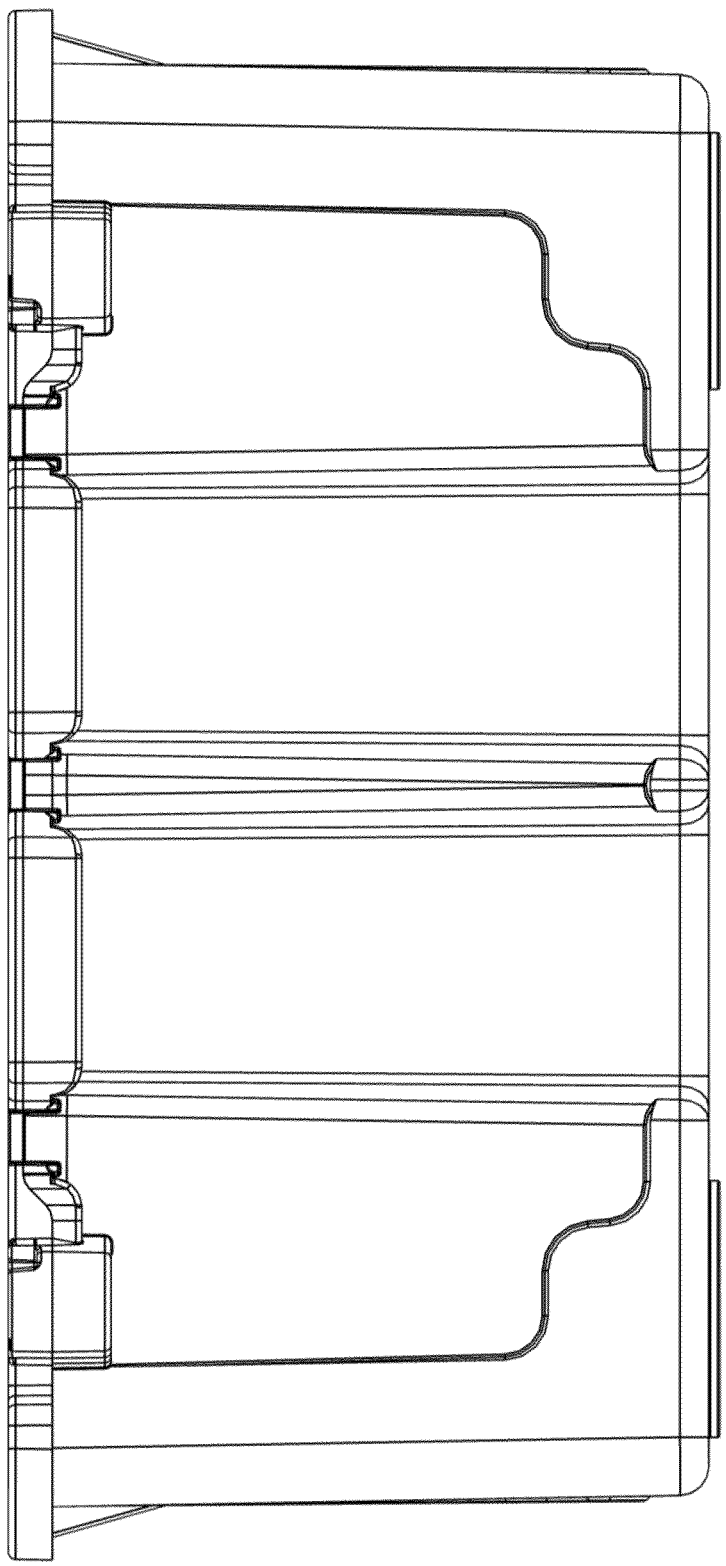
Figure 18A:
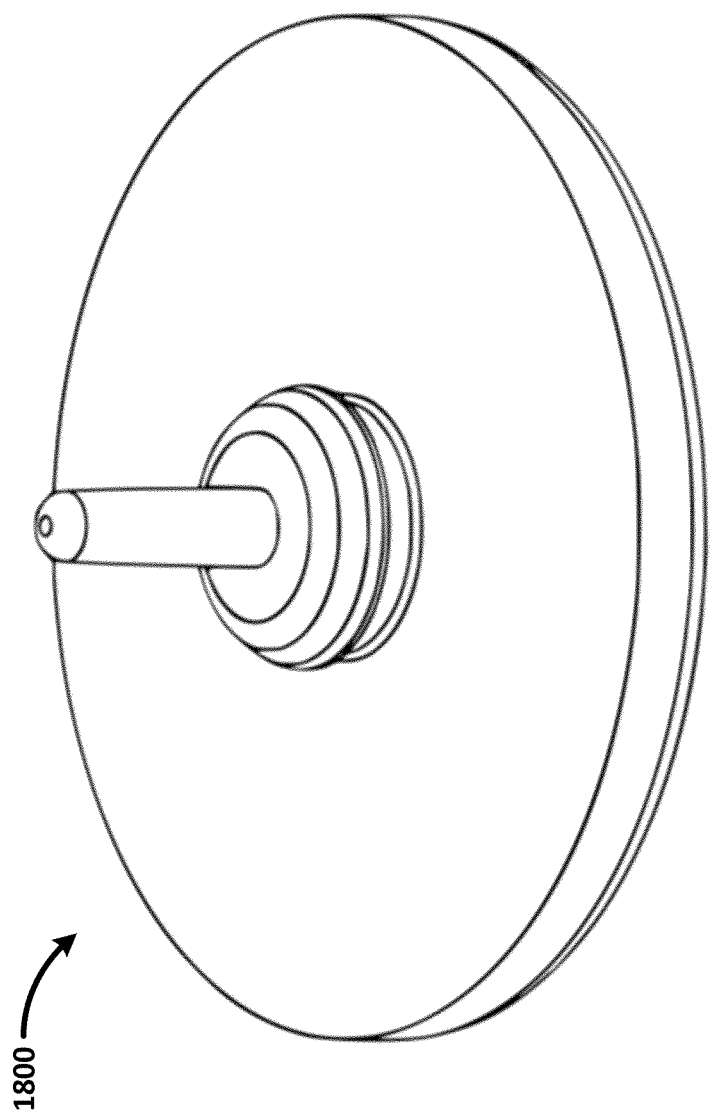
FIG. 18A, FIG. 18B, FIG. 18C, FIG. 18D, and FIG. 18E, show a top perspective view, a bottom perspective view, a bottom view, a top view, and a side view, respectively, of an exemplary foot.
Figure 18B:
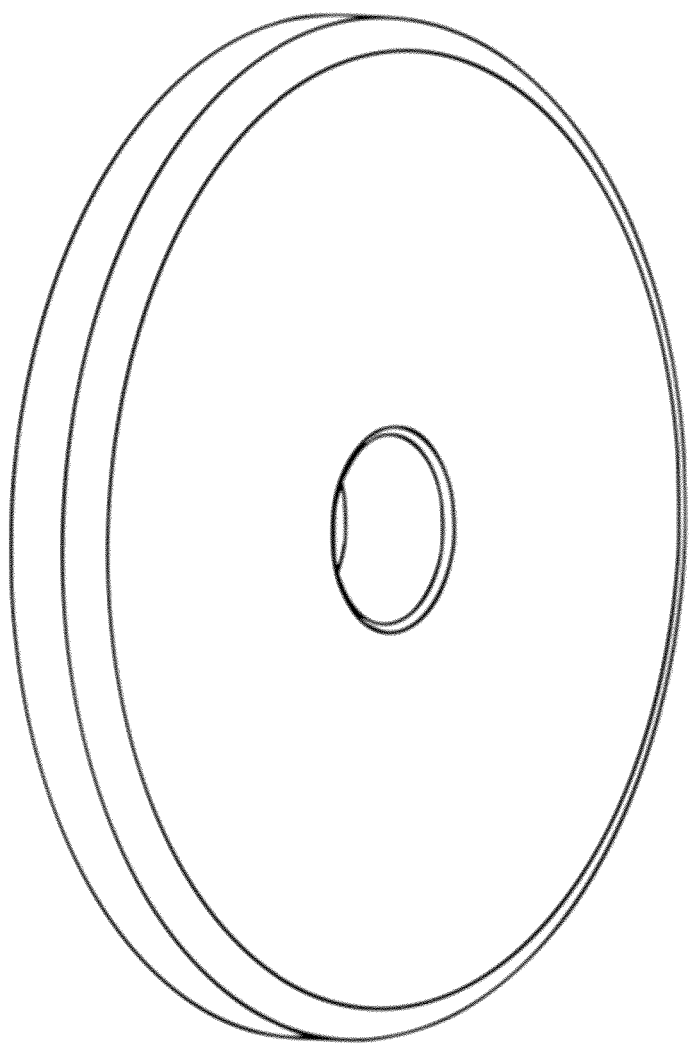
Figure 18C:
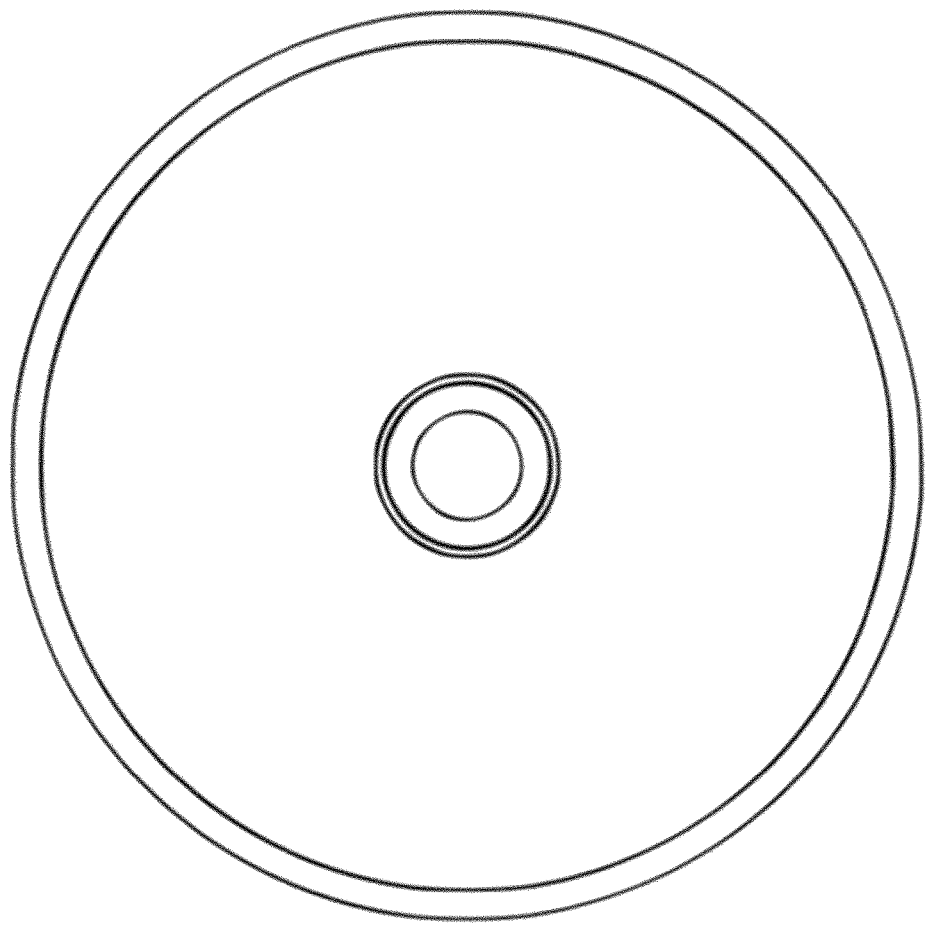
Figure 18D:
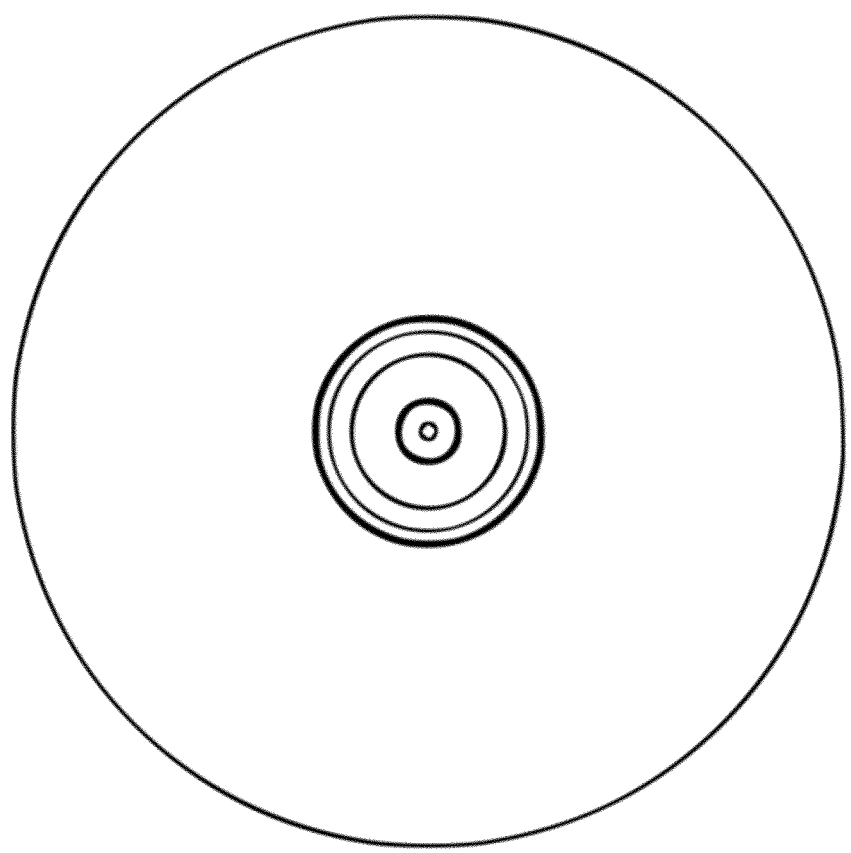
Figure 18E:
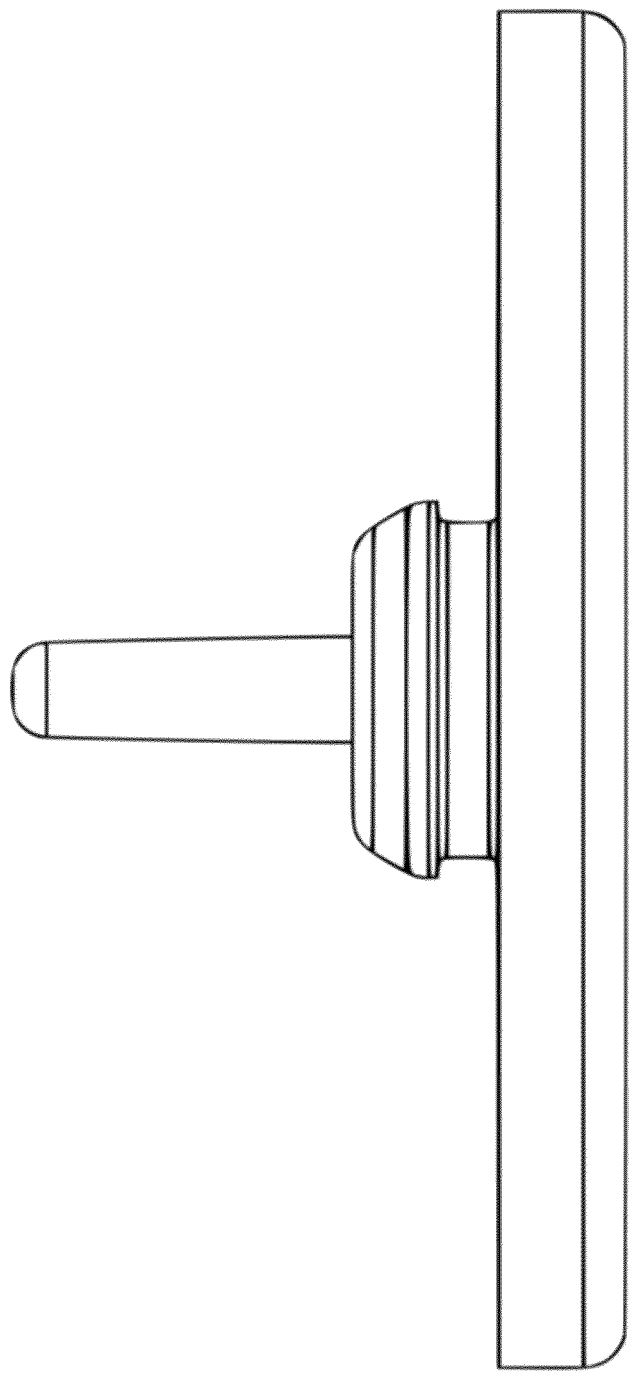

FIG. 14 shows a prototype of an exemplary container reinforcing coupler 1400. The exemplary container reinforcing coupler 1400 may be used to interlock the long repositionable divider 1405 to the exemplary container 1410.

FIG. 15A, FIG. 15B, FIG. 15C, FIG. 15D, FIG. 15E, FIG. 15F, and FIG. 15G show a perspective view, a top view, a bottom view, a front view, a back view, a left-side view, and a right-side view, respectively, of an exemplary short repositionable divider 1500 (e.g., subdivider, short repositionable divider 210).

FIG. 16A, FIG. 16B, FIG. 16C, FIG. 16D, FIG. 16E, and FIG. 16F show a side view, a perspective view, another perspective view, a bottom view, a top view, and an end view, respectively, of an exemplary handle 1600 (e.g., handle 310).

FIG. 17A, FIG. 17B, FIG. 17C, FIG. 17D, FIG. 17E, show a perspective view, a top view, a bottom view, a front view, and a left-side view, respectively, of an exemplary container 1700 (e.g., RSC 100).

FIG. 18A, FIG. 18B, FIG. 18C, FIG. 18D, and FIG. 18E, show a top perspective view, a bottom perspective view, a bottom view, a top view, and a side view, respectively, of an exemplary foot 1800. For example, as shown in FIG. 8C, the foot 1800 may be coupled into a corresponding aperture in the RSC 100. The foot 1800 may, for example, be rubber. The foot may, for example, resist movement of the RSC 100 during travel. For example, when the RSC 100 is strapped down, the foot 1800 may resist movement. As shown, the foot 1800 may be made with a coupler configured to retainably couple the foot 1800 to the RSC 100.

Although various embodiments have been described with reference to the figures, other embodiments are possible. For example, the RSC 100 may be carried on a truck bed. In some implementations, the RSC 100 may also be fitted to carry on a high-speed water vessel, such as a speedboat, a catamaran, and/or other water vessels. For example, the RSC 100 may be stacked on top of a passenger ferry for carrying personal luggage of the passengers. In some embodiments, an RSC (e.g., RSC 100) may be sized and/or shaped to be carried by various off-road vehicles (e.g., utility terrain vehicles, all-terrain vehicles). Some embodiments may, for example, be sized and/or shaped to be used with utility vehicles (e.g., utility trailers, lowboy trailers, flatbed trailers, flatbed trucks, cargo trucks).

In some implementations, the RSC 100 may include magnetic feet. The magnetic feet may, for example, reduce or eliminate sliding of the RSC 100 during travel (e.g., in the bed of a truck). In some embodiments, the magnetic feet may engage with an anti-theft module on a truck bed. For example, the anti-theft module may be electronically controlled such that, once engaged, the RSC 100 is locked onto the truck bed by a substantially high magnetic force, rendering theft of the RSC 100 impossible.

In some embodiments, securing members may be disposed in and/or coupled to divider receiving features (e.g., channels) to releasably couple dividers to dividers and/or dividers to walls. In an illustrative example, rubber parts may be disposed at least partially in a channel and/or on an edge of a divider such that, when the edge of the divider us brought into register with the channel and they are releasably coupled, the rubber part(s) may advantageously resist uncoupling of the divider and channel. Various embodiments may, for example, advantageously enable reduced manufacturing costs (e.g., due to reduced mold size), reduced shipping costs (e.g., compact shipping size due to nesting), or some combination thereof.

Although an exemplary system has been described with reference to FIGS. 1-14, other implementations may be deployed in other industrial, scientific, medical, commercial, and/or residential applications.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A container system comprising:
   a container comprising walls defining a cavity, the walls comprising two opposing walls, the two opposing walls comprising at least one coupling module;
   a divider configured to be disposed within the cavity and extending between the two opposing walls, the divider comprising divider coupling features at opposing ends;
   a plurality of couplers, each extending along a longitudinal axis and comprising a straddler having a parallel protrusion extending out of the longitudinal axis, and configured to be coupled to one of the divider coupling features and a corresponding of the at least one coupling module such that, when the plurality of couplers are operated into a latched mode:
   tension is applied urging the two opposing walls towards each other against the opposing ends of the divider, and
   the parallel protrusions extend out of the longitudinal axis to an opposing side of the divider to resist lateral movement of the divider relative to the corresponding coupler.

2. The system of claim 1, wherein each of the plurality of couplers comprises a first engagement member and a second engagement member distal to the first engagement member.

3. The system of claim 2, wherein:
   the first engagement member and the second engagement member operate together as, a pair of couplers, each configured to be coupled to one of the divider coupling features and a corresponding of the at least one coupling module such that, when the pair of couplers are operated into a latched mode, tension is applied urging the two opposing walls towards each other against the opposing ends of the divider.

4. The system of claim 1, further comprising:
   a subdivider having opposing ends and a coupling module disposed at each of the opposing ends,
   wherein:
   the divider comprises a receiving module disposed on a side of the divider between the opposing ends of the divider;
   at least one of the coupling modules of the subdivider and the receiving module are configured to interlock together such that, when the at least one of the coupling modules and the receiving module are operated into an interlocked mode, they couple the corresponding opposing end of the subdivider to the side of the divider and resist lateral separation of the subdivider and the divider.

5. The system of claim 4, wherein:
   the divider further comprises a coupling feature on the side of the divider,
   the subdivider further comprises a coupling feature on the corresponding opposing end,
   the coupling feature of the divider and the coupling feature of the subdivider are configured such that, in the interlocked mode, the coupling feature of the subdivider is brought into register with the coupling feature of the subdivider and releasably engage each other such that they resist vertical displacement of the subdivider relative to the divider.

6. A container system comprising:
   a container having walls defining a cavity, including two opposing walls having at least one coupling module;
   a divider configured to be disposed within the cavity and extending between the two opposing walls, the divider having divider coupling features at opposing ends;
   a pair of couplers, each configured to be detachably coupled to one of the divider coupling features and a corresponding of the at least one coupling module such that, when the pair of couplers are operated into a latched mode, tension is applied urging the two opposing walls towards each other against the opposing ends of the divider.

7. The system of claim 6, wherein each of the pair of couplers extends along a longitudinal axis in an unlatched mode, and comprise a first engagement member and a second engagement member distal to the first engagement member.

8. The system of claim 7, wherein, each of the pair of couplers is configured such that:
   when the first engagement member is releasably coupled to a coupling feature of a divider within a container, and
   when the second engagement member is operated out of the longitudinal axis and releasably coupled to a coupling feature of a wall of the container,
   then the wall and the divider are releasably coupled together by the corresponding coupler of the pair of couplers.

9. The system of claim 8, each coupler comprising a straddler having a parallel protrusion extending out of the longitudinal axis and configured such that, when the second engagement member is operated out of the longitudinal axis and releasably coupled to the wall, the parallel protrusion extends out of the longitudinal axis to an opposing side of the divider to resist lateral movement of the divider relative to the coupler.

10. The system of claim 6, further comprising:
    a subdivider having opposing ends and a coupling module disposed at each of the opposing ends, wherein:
the divider comprises a receiving module disposed on a side of the divider between the opposing ends of the divider;
at least one of the coupling modules of the subdivider and the receiving module are configured to interlock together such that, when the at least one of the coupling modules and the receiving module are operated into an interlocked mode, they couple the corresponding opposing end of the subdivider to the side of the divider and resist lateral separation of the subdivider and the divider.

11. The system of claim 10, wherein:
the divider further comprises a coupling feature on the side of the divider,
the subdivider further comprises a coupling feature on the corresponding opposing end,
the coupling feature of the divider and the coupling feature of the subdivider are configured such that, in the interlocked mode, the coupling feature of the subdivider is brought into register with the coupling feature of the subdivider and releasably engage each other such that they resist vertical displacement of the subdivider relative to the divider.

12. The system of claim 6, wherein the pair of couplers are coupled together as a unitary body configured to span the two opposing walls.

13. An apparatus comprising:
a detachable coupler extending along a longitudinal axis and including a first engagement member and a second engagement member distal to the first engagement member,
wherein the detachable coupler is configured such that:
when the first engagement member is releasably coupled to a coupling feature of a divider within a container, and
when the second engagement member is operated out of the longitudinal axis and releasably coupled to a coupling feature of a wall of the container,
then the wall and the divider are releasably coupled together by the detachable coupler applying a tensile force urging the wall and the divider towards each other;
wherein the first engagement member, formed as an elbow at one end of the detachable coupler, is configured to couple with an elbow receiving unit in the divider.

14. The apparatus of claim 13, the detachable coupler comprising a straddler having a parallel protrusion extending out of the longitudinal axis and configured, such that, when the second engagement member is operated out of the longitudinal axis and releasably coupled to the wall, the parallel protrusion extends out of the longitudinal axis to an opposing side of the divider to resist lateral movement of the divider relative to the coupler.

15. The apparatus of claim 13, the detachable coupler extending along the longitudinal axis distal to the second engagement member and comprising a transversely extending handle module disposed at a distal end.

16. The apparatus of claim 13, wherein the first engagement member comprises an at least partially cylindrical cross-section in an axis orthogonal to the longitudinal axis, the first engagement member configured to be detachably and rotatably coupled to a socket of the divider.

17. The apparatus of claim 13, wherein the second engagement member comprises a protrusion extending transversely to the longitudinal axis, the second engagement member configured to be releasably coupled within a socket of the wall of the container.

18. The apparatus of claim 13, in combination with the container and the divider, wherein the container has walls defining a cavity, including two opposing walls that have at least one coupling module.

19. The apparatus of claim 18, wherein the divider is configured to be disposed within the cavity and to extend between the two opposing walls, the divider having coupling features at opposing ends.

20. The apparatus of claim 19, wherein the wall comprises a lip and each of the at least one coupling module comprise:
a socket disposed under the lip and configured to releasably receive the second engagement member; and,
a channel in the lip configured to receive at least a portion of the corresponding detachable coupler between the first engagement member and the second engagement member.

* * * * *